United States Patent
Gao et al.

(10) Patent No.: US 11,109,060 B2
(45) Date of Patent: Aug. 31, 2021

(54) IMAGE PREDICTION METHOD AND APPARATUS

(71) Applicant: Huawei Technologies Co., Ltd., Shenzhen (CN)

(72) Inventors: Shan Gao, Dongguan (CN); Huanbang Chen, Shenzhen (CN); Haitao Yang, Shenzhen (CN); Jiantong Zhou, Shenzhen (CN); Shan Liu, Shenzhen (CN); Sriram Sethuraman, Bangalore (IN); Jay Shingala, Bangalore (IN); Jeeva Raj A, Bangalore (IN); Sagar Kotecha, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/815,914

(22) Filed: Mar. 11, 2020

(65) Prior Publication Data

US 2020/0213616 A1   Jul. 2, 2020

Related U.S. Application Data

(63) Continuation of application No. PCT/CN2018/112450, filed on Oct. 29, 2018.

(30) Foreign Application Priority Data

Nov. 7, 2017   (CN) .......................... 201711086572.6

(51) Int. Cl.
*H04N 19/176* (2014.01)
*H04N 19/523* (2014.01)
*H04N 19/56* (2014.01)

(52) U.S. Cl.
CPC .......... *H04N 19/56* (2014.11); *H04N 19/176* (2014.11); *H04N 19/523* (2014.11)

(58) Field of Classification Search
CPC .............................. H04N 19/56; H04N 19/176
See application file for complete search history.

(56) References Cited

U.S. PATENT DOCUMENTS 6,289,049 B1 * 9/2001 Kim ...................... H04N 19/517
                                                     375/240.16
7,580,456 B2 * 8/2009 Li ........................ H04N 19/56
                                                     375/240

(Continued)

FOREIGN PATENT DOCUMENTS

| CN | 103108177 A | | 5/2013 |
|----|-------------|---|--------|
| CN | WO2013/067962 | * | 5/2013 |
| TW | 201310392 A | | 3/2013 |

*Primary Examiner* — Irfan Habib
(74) *Attorney, Agent, or Firm* — Conley Rose, P.C.

(57) ABSTRACT

An image prediction method and apparatus includes obtaining predicted motion information of an image block; determining an initial predicted block of the image block according to the predicted motion information and a reference image of the image block; performing, according to the predicted motion information, L iterative searches in the reference image using an integer pixel step size to obtain an intermediate predicted block of the image block; performing a single search in the reference image using a fractional pixel step size to obtain M predicted blocks of the image block; determining a target predicted block of the image block according to the M predicted blocks and the intermediate predicted block; and obtaining a predicted value of a pixel value of the image block according to a pixel value of the target predicted block.

20 Claims, 15 Drawing Sheets

(56) References Cited

U.S. PATENT DOCUMENTS

| | | | | |
|---|---|---|---|---|
| 8,081,681 | B2 * | 12/2011 | Guo | H04N 19/61 375/240.17 |
| 8,824,553 | B2 * | 9/2014 | Ameres | H04N 19/114 375/240.16 |
| 8,976,863 | B2 * | 3/2015 | Kim | H04N 19/521 375/240.16 |
| 9,258,570 | B2 * | 2/2016 | Srinivasan | H04N 19/119 |
| 9,332,264 | B2 * | 5/2016 | Lu | H04N 19/557 |
| 9,420,306 | B2 * | 8/2016 | Chen | H04N 19/533 |
| 9,503,746 | B2 * | 11/2016 | Xu | H04N 19/463 |
| 9,521,409 | B2 * | 12/2016 | Chono | H04N 19/523 |
| 9,756,331 | B1 * | 9/2017 | Grange | H04N 19/105 |
| 9,924,161 | B2 * | 3/2018 | Wilkins | H04N 19/124 |
| 9,942,560 | B2 * | 4/2018 | Silkin | H04N 19/42 |
| 10,142,633 | B2 * | 11/2018 | Tanner | H04N 19/129 |
| 10,178,406 | B2 * | 1/2019 | Liang | H04N 19/124 |
| 10,200,713 | B2 * | 2/2019 | Pang | H04N 19/57 |
| 10,327,008 | B2 * | 6/2019 | Chien | H04N 19/176 |
| 10,477,233 | B2 * | 11/2019 | Chou | H04N 19/587 |
| 10,560,699 | B2 * | 2/2020 | Kim | H04N 19/513 |
| 10,743,023 | B2 * | 8/2020 | Morigami | H04N 19/57 |
| 10,812,791 | B2 * | 10/2020 | Chien | H04N 19/52 |
| 2010/0220786 | A1 * | 9/2010 | Wang | H04N 19/43 375/240.15 |
| 2011/0299596 | A1 * | 12/2011 | Guo | H04N 19/105 375/240.16 |
| 2013/0051473 | A1 | 2/2013 | Chen et al. | |
| 2015/0063459 | A1 * | 3/2015 | Hsu | H04N 19/137 375/240.16 |
| 2015/0195527 | A1 * | 7/2015 | Zhou | H04N 19/70 375/240.02 |
| 2016/0360234 | A1 * | 12/2016 | Tourapis | H04N 19/156 |
| 2020/0351513 | A1 * | 11/2020 | Lee | H04N 19/513 |

* cited by examiner

| $A_{-1,-1}$ | | | | $A_{0,-1}$ | | | | $A_{1,-1}$ | | | | $A_{2,-1}$ |
|---|---|---|---|---|---|---|---|---|---|---|---|---|
| | | | | | | | | | | | | |
| | | | | | | | | | | | | |
| | | | | | | | | | | | | |
| $A_{-1,0}$ | | | | $A_{0,0}$ | | | | $A_{1,0}$ | $a_{0,0}$ | $b_{0,0}$ | $c_{0,0}$ | $A_{2,0}$ |
| | | | | | | | | $d_{0,0}$ | $e_{0,0}$ | $f_{0,0}$ | $g_{0,0}$ | |
| | | | | | | | | $h_{0,0}$ | $i_{0,0}$ | $j_{0,0}$ | $k_{0,0}$ | |
| | | | | | | | | $n_{0,0}$ | $p_{0,0}$ | $q_{0,0}$ | $r_{0,0}$ | |
| $A_{-1,1}$ | | | | $A_{0,1}$ | | | | $A_{1,1}$ | | | | $A_{2,1}$ |
| | | | | | | | | | | | | |
| | | | | | | | | | | | | |
| | | | | | | | | | | | | |
| $A_{-1,2}$ | | | | $A_{0,2}$ | | | | $A_{1,2}$ | | | | $A_{2,2}$ |

FIG. 6

IMAGE PREDICTION METHOD AND APPARATUS

CROSS-REFERENCE TO RELATED APPLICATIONS

This application is a continuation application of International Application No. PCT/CN2018/112450, filed on Oct. 29, 2018, which claims priority to Chinese Patent Application No. 201711086572.6, filed on Nov. 7, 2017. The disclosures of the aforementioned applications are hereby incorporated by reference in their entireties.

TECHNICAL FIELD

This application relates to the field of video encoding and decoding technologies, and more specifically, to an image prediction method and apparatus.

BACKGROUND

When encoding or decoding processing is performed on an image of a video, to reduce redundancy of transmitted data, a pixel value of an image block in a to-be-processed image needs to be predicted. When prediction is performed on an image, an initial predicted block may be first determined in a reference image of the to-be-processed image. Then, multiple searches are performed around the initial predicted block, and at least one predicted block that is found is compared with the initial predicted block, to find an optimal predicted block.

In a conventional solution, when a search is performed around an initial predicted block, a predicted block is first searched for using an integer pixel step size, and then, a predicted block is searched for using a fractional pixel step size. Each time a search is performed, the search not only needs to be performed using an integer pixel step size, but also needs to be performed using a fractional pixel step size. As a result, a relatively large volume of data is generated each time the search is performed, and a volume of read data is increased during image prediction. Consequently, complexity of the image prediction is increased.

SUMMARY

This application provides an image prediction method and apparatus, to reduce a volume of read data during image prediction.

According to a first aspect, an image prediction method is provided. The method includes obtaining predicted motion information of an image block; determining an initial predicted block of the image block according to the predicted motion information and a reference image of the image block; performing, according to the predicted motion information, L iterative searches in the reference image using an integer pixel step size, to obtain an intermediate predicted block of the image block, where L is a preset value and is an integer greater than 1; performing a single search in the reference image using a fractional pixel step size, to obtain M predicted blocks of the image block, where M is a preset value and is an integer greater than 1; determining a target predicted block of the image block according to the M predicted blocks and the intermediate predicted block; and obtaining a predicted value of a pixel value of the image block according to a pixel value of the target predicted block.

In this application, after multiple iterative searches are performed using the integer pixel step size, based on results of the iterative searches performed using the integer pixel step size, a search is further performed using the fractional pixel step size, and a target predicted block is determined based on predicted blocks obtained by means of the search performed using the fractional pixel step size. Compared with a manner of performing searches using the integer pixel step size and the fractional pixel step size alternately, a volume of read data can be reduced in a search process and complexity of image prediction can be reduced.

With reference to the first aspect, in some implementations of the first aspect, the determining an initial predicted block of the image block according to the predicted motion information and a reference image of the image block includes obtaining, in the reference image using an interpolation filter according to the predicted motion information, a first predicted block and a second predicted block that correspond to the image block, where a gain of the interpolation filter is greater than 1; and obtaining the initial predicted block according to the first predicted block and the second predicted block, where pixel values of the first predicted block, the second predicted block, and the initial predicted block all have a same bit width.

The first predicted block and the second predicted block whose pixel values have relatively large bit widths can be obtained using the interpolation filter. In this way, the initial predicted block can be determined more accurately according to the first predicted block and the second predicted block whose pixel values have relatively large bit widths.

With reference to the first aspect, in some implementations of the first aspect, bit widths of pixel values of the intermediate predicted block and the target predicted block are both the same as a bit width of a pixel value of the initial predicted block.

Because the pixel value of the initial predicted block has a relatively large bit width, and the bit widths of the pixel values of the intermediate predicted block and the target predicted block are the same as the bit width of the pixel value of the initial predicted block, that is, for the intermediate predicted block, the initial predicted block, and the target predicted block, the pixel values are all indicated using the relatively large bit widths, accuracy of image prediction can be improved using a pixel value having a relatively large bit width in an image prediction process.

The obtaining the initial predicted block according to the first predicted block and the second predicted block may be obtaining the pixel value of the initial predicted block according to the pixel value of the first predicted block and the pixel value of the second predicted block.

With reference to the first aspect, in some implementations of the first aspect, the obtaining the initial predicted block according to the first predicted block and the second predicted block includes performing weighted processing on the pixel values of the first predicted block and the second predicted block, to obtain the pixel value of the initial predicted block.

With reference to the first aspect, in some implementations of the first aspect, the obtaining, in the reference image using an interpolation filter according to the predicted motion information, a first predicted block and a second predicted block that correspond to the image block includes obtaining, in a first reference image using the interpolation filter according to the predicted motion information, a first predicted block corresponding to the image block; and obtaining, in a second reference image using the interpolation filter according to the predicted motion information, a second predicted block corresponding to the image block, where the first reference image is a reference image in a first reference image list, the second reference image is a reference image in a second reference image list, and the first reference image list and the second reference image list are different reference image lists that are used when prediction is performed on the image block.

With reference to the first aspect, in some implementations of the first aspect, the determining an initial predicted block of the image block according to the predicted motion information and a reference image of the image block includes obtaining, in the reference image using an interpolation filter according to the predicted motion information, a first predicted block and a second predicted block that correspond to the image block, where a gain of the interpolation filter is greater than 1; performing a shift operation on a pixel value of the first predicted block and a pixel value of the second predicted block, to reduce bit widths of the pixel values of the first predicted block and the second predicted block to a target bit width, where the target bit width is a bit width of a reconstructed pixel value of the image block; and obtaining the initial predicted block according to the first predicted block and the second predicted block, where a bit width of a pixel value of the initial predicted block is the target bit width.

With reference to the first aspect, in some implementations of the first aspect, the bit widths of the pixel values of the intermediate predicted block and the target predicted block are both the target bit width.

Because all of the bit widths of the pixel values of the initial predicted block, the intermediate predicted block, and the target predicted block are the target bit width, in a process of performing prediction on an image, conversions of a pixel value between different bit widths can be reduced, and the predicted value of the pixel value of the image block is determined according to the target predicted block having the pixel value whose bit width is the target bit width, instead of determining the predicted value of the pixel value of the image block after performing motion compensation to obtain a predicted block whose pixel value has a large bit width such that an operation of motion compensation is omitted, a process of image prediction is simplified, and complexity of the image prediction is reduced.

With reference to the first aspect, in some implementations of the first aspect, the performing, according to the predicted motion information, L iterative searches in the reference image using an integer pixel step size includes repeatedly performing the following step 1 to step 3 a total of L times, to use a finally obtained initial predicted block as the intermediate predicted block. In step 1: obtaining current predicted motion information, where when step 1 is performed for the first time, the current predicted motion information is predicted motion information of the image block, and when step 1 is performed for the $i^{th}$ time, the current predicted motion information is information about motion of the image block toward a current initial predicted block, where i is an integer less than or equal to L and greater than 1; step 2: performing, according to the current predicted motion information, a search in the reference image using the integer pixel step size, to obtain N predicted blocks corresponding to the image block, where N is a preset value and is an integer greater than 1; and step 3: obtaining a new current initial predicted block according to the N predicted blocks and the current initial predicted block.

An intermediate predicted block whose pixel value is relatively close to the pixel value of the image block can be determined by performing multiple iterative searches.

With reference to the first aspect, in some implementations of the first aspect, the performing a single search in the reference image using a fractional pixel step size, to obtain M predicted blocks of the image block includes performing, according to the current predicted motion information, the single search in the reference image using the fractional pixel step size, to obtain the M predicted blocks of the image block.

With reference to the first aspect, in some implementations of the first aspect, the determining a target predicted block of the image block according to the M predicted blocks and the intermediate predicted block includes determining, in the M predicted blocks, a predicted block having a pixel value whose difference from a pixel value of the intermediate predicted block is the smallest as the target predicted block.

A predicted block closer to the image block can be obtained by determining through comparison a difference between a pixel value of each of the M predicted blocks and the pixel value of the initial predicted block in order to improve an image prediction effect.

With reference to the first aspect, in some implementations of the first aspect, the reference image includes a first direction reference image and a second direction reference image, and the performing a single search in the reference image using a fractional pixel step size, to obtain M predicted blocks of the image block includes performing a search in the first direction reference image using the fractional pixel step size, to obtain the M predicted blocks of the image block; and the determining a target predicted block of the image block according to the M predicted blocks and the intermediate predicted block includes determining, in the M predicted blocks corresponding to the image block, a predicted block having a pixel value whose difference from the pixel value of the intermediate predicted block is the smallest as a first target predicted block; determining a first motion vector of the image block toward the first target predicted block; determining a second motion vector according to the first motion vector and according to a preset rule; determining, in the second direction reference image according to the second motion vector, a second target predicted block corresponding to the image block, where the first direction reference image and the second direction reference image are respectively a forward reference image and a backward reference image, or the first direction reference image and the second direction reference image are respectively a backward reference image and a forward reference image; and determining the target predicted block according to the first target predicted block and the second target predicted block.

A predicted block of an image block in a reference image in another direction is derived from a predicted block that is obtained by means of a search in a reference image in a direction such that a large quantity of search operations can be omitted, and complexity during image prediction is reduced. Moreover, because both a predicted block that corresponds to the image block and that is in a forward reference image and a predicted block that corresponds to the image block and that is in a backward reference image are used when the target predicted block is determined, accuracy of image prediction can be ensured while reducing complexity of the image prediction.

With reference to the first aspect, in some implementations of the first aspect, the reference image includes a first reference image and a second reference image, and the performing a single search in the reference image using a fractional pixel step size, to obtain M predicted blocks of the image block includes performing a search in the first reference image using the fractional pixel step size, to obtain the M predicted blocks of the image block; and the determining a target predicted block of the image block according to the M predicted blocks and the intermediate predicted block includes determining, in the M predicted blocks corresponding to the image block, a predicted block having a pixel value whose difference from the pixel value of the intermediate predicted block is the smallest as a first target predicted block; determining a first motion vector of the image block toward the first target predicted block; determining a second motion vector according to the first motion vector and according to a preset rule; determining, in the second reference image according to the second motion vector, a second target predicted block corresponding to the image block; and determining the target predicted block according to the first target predicted block and the second target predicted block, where the first reference image is a reference image in a first reference image list, the second reference image is a reference image in a second reference image list, and the first reference image list and the second reference image list are different reference image lists that are used when prediction is performed on the image block.

A predicted block, of the image block, in the second reference image is derived from a predicted block that is obtained by means of a search in the first reference image such that a large quantity of search operations can be omitted, and complexity during image prediction is reduced.

The first reference image and the second reference image may be forward reference images or may be backward reference images. Further, the following situations may be included. For example, both the first reference image and the second reference image are forward reference images; both the first reference image and the second reference image are backward reference images; and the first reference image is a forward reference image, and the second reference image is a backward reference image.

In addition, the first reference image may be one or more reference images, and likewise, the second reference image may also be one or more reference images.

With reference to the first aspect, in some implementations of the first aspect, before the determining a second motion vector according to the first motion vector and according to a preset rule, the method further includes determining that a distance between the image block and the first direction reference image is less than or equal to a distance between the image block and the second direction reference image.

When the distance between the image block and the first direction reference image is relatively short, a search is performed in the first direction reference image such that complexity of the search can be reduced.

With reference to the first aspect, in some implementations of the first aspect, the method further includes obtaining a motion vector of the image block toward the target predicted block; and obtaining a motion vector of the image block according to the motion vector of the image block toward the target predicted block, where the motion vector of the image block is used to predict another image block.

Determining a motion vector of the image block according to the motion vector toward the target predicted block may be further directly determining a motion vector of a target motion block as the motion vector of the image block, that is, updating motion vector of the image block such that when image prediction is performed next time, effective prediction can be performed on another image block according to the image block.

According to a second aspect, an image prediction method is provided. The method includes obtaining predicted motion information of an image block; determining an initial predicted block of the image block according to the predicted motion information and a reference image of the image block; performing, according to the predicted motion information, a single search in the reference image using an integer pixel step size, to obtain M predicted blocks of the image block, where M is a preset value and is an integer greater than 1; determining an intermediate predicted block of the image block according to the M predicted blocks and the initial predicted block that correspond to the image block; determining the intermediate predicted block as the initial predicted block; determining information about motion of the image block toward the intermediate predicted block as the predicted motion information; performing, according to the predicted motion information, L iterative searches in the reference image using a fractional pixel step size, to obtain a target predicted block of the image block, where L is a preset value and is an integer greater than 1; and obtaining a predicted value of a pixel value of the image block according to a pixel value of the target predicted block.

In this application, after the single search is performed using the integer pixel step size, based on a result of the single search performed using the integer pixel step size, multiple iterative searches are further performed using the fractional pixel step size, and a target predicted block is determined based on predicted blocks obtained by means of the multiple iterative searches using the fractional pixel step size. Compared with a manner of performing searches using the integer pixel step size and the fractional pixel step size alternately, a volume of read data can be reduced in a search process and complexity of image prediction can be reduced.

According to a third aspect, an image prediction apparatus is provided. The apparatus includes modules configured to perform the method in the first aspect or various implementations thereof.

According to a fourth aspect, an image prediction apparatus is provided. The apparatus includes modules configured to perform the method in the second aspect or various implementations thereof.

According to a fifth aspect, a terminal device is provided. The terminal device includes a memory configured to store a program; and a processor configured to execute the program stored in the memory, where when the program is executed, the processor is configured to perform the method in the first aspect or various implementations thereof.

According to a sixth aspect, a video encoder is provided, including a non-volatile storage medium and a central processing unit, where the non-volatile storage medium stores an executable program, and the central processing unit is connected to the non-volatile storage medium and executes the executable program to perform the method in the first aspect or various implementations thereof.

According to a seventh aspect, a video encoder is provided, including a non-volatile storage medium and a central processing unit, where the non-volatile storage medium stores an executable program, and the central processing unit is connected to the non-volatile storage medium and executes the executable program to perform the method in the second aspect or various implementations thereof.

According to an eighth aspect, a video decoder is provided, including a non-volatile storage medium and a central processing unit, where the non-volatile storage medium stores an executable program, and the central processing unit is connected to the non-volatile storage medium and executes the executable program to perform the method in the first aspect or various implementations thereof.

According to a ninth aspect, a video decoder is provided, including a non-volatile storage medium and a central processing unit, where the non-volatile storage medium stores an executable program, and the central processing unit is connected to the non-volatile storage medium and executes the executable program to perform the method in the second aspect or various implementations thereof.

According to a tenth aspect, a video encoding system is provided, including a non-volatile storage medium and a central processing unit, where the non-volatile storage medium stores an executable program, and the central processing unit is connected to the non-volatile storage medium and executes the executable program to perform the method in the first aspect or various implementations thereof.

According to an eleventh aspect, a video encoding system is provided, including a non-volatile storage medium and a central processing unit, where the non-volatile storage medium stores an executable program, and the central processing unit is connected to the non-volatile storage medium and executes the executable program to perform the method in the second aspect or various implementations thereof.

According to a twelfth aspect, a computer readable medium is provided, where the computer readable medium stores program code to be executed by a device, and the program code includes an instruction used to perform the method in the first aspect or various implementations thereof.

According to a thirteenth aspect, a computer readable medium is provided, where the computer readable medium stores program code to be executed by a device, and the program code includes an instruction used to perform the method in the second aspect or various implementations thereof.

According to a fourteenth aspect, a decoder is provided. The decoder includes the image prediction apparatus in the third aspect or the fourth aspect and a reconstruction module, where the reconstruction module is configured to obtain a reconstructed pixel value of the image block according to the predicted value of the image block obtained by the image prediction apparatus.

According to a fifteenth aspect, an encoder is provided. The encoder includes the image prediction apparatus in the third aspect or the fourth aspect and a reconstruction module, where the reconstruction module is configured to obtain a reconstructed pixel value of the image block according to the predicted value of the image block obtained by the image prediction apparatus.

BRIEF DESCRIPTION OF DRAWINGS

FIG. 6 is a schematic diagram of a pixel at an integer pixel position and a pixel at a fractional pixel position;

DESCRIPTION OF EMBODIMENTS

Figure 1:
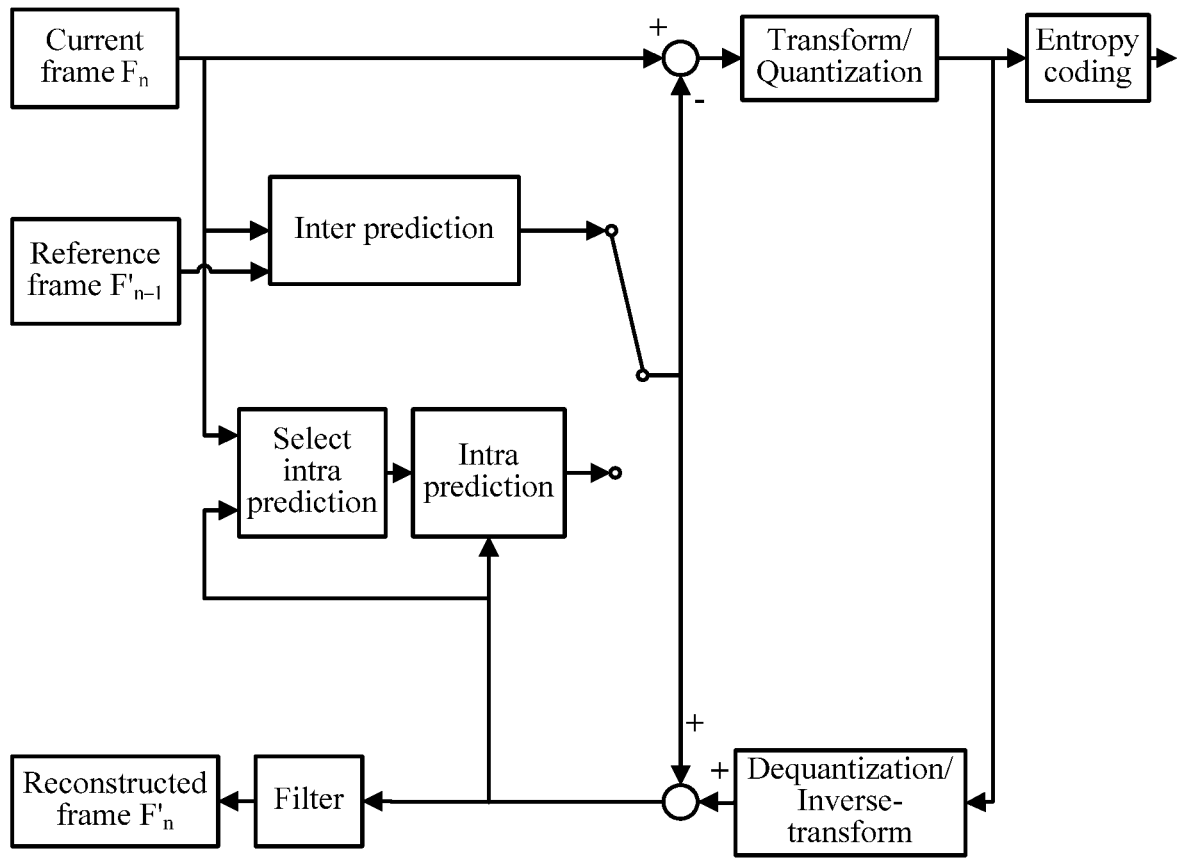
FIG. 1 is a schematic flowchart of a video encoding process.

The following describes technical solutions of this application with reference to the accompanying drawings.

A video is usually formed by many frames of images in a specific sequence. Usually, massive repeated information (redundant information) exists in one frame of image or between different frames of images. For example, one frame of image usually includes many parts that are the same or similar in terms of a spatial structure. For example, a video file includes a lot of spatially redundant information. In addition, the video file also includes a lot of temporally redundant information. This is caused by a composition structure of a video. For example, a frame rate of video sampling is usually 25 frames/second to 60 frames/second. For example, a sampling time interval between two adjacent frames is within a range from 1/60 second to 1/25 second. In such a short time, massive similar information almost exists in all images obtained by means of sampling, and a high association exists between the images.

In addition, relevant researches indicate that a part that can be compressed, that is, visual redundancy, also exists in video information from the perspective of a psychological feature such as visual sensitivity of human eyes. The visual redundancy means that a video bitstream is properly compressed using a feature that human eyes are relatively sensitive to a luminance change but relatively insensitive to a chrominance change. For example, in a high-luminance area, sensitivity of human eye vision to a luminance change is presented in a descending trend. The human eye vision turns to be relatively sensitive to an edge of an object. In addition, human eyes are relatively insensitive to an internal area, but are relatively sensitive to an entire structure. A final service target of a video image is a human group. Therefore, compression processing may be performed on an original video image by fully using such features of human eyes, to achieve a better compression effect. In addition to the spatial redundancy, the temporal redundancy, and the visual redundancy that are mentioned above, a series of redundant information, such as information entropy redundancy, structural redundancy, knowledge redundancy, and importance redundancy, may also exist in the video image information. An objective of video encoding (which may also be referred to as video compression coding) is to remove redundant information from a video sequence using various technical methods in order to reduce storage space and save transmission bandwidth.

Currently, in an international universal range, there are four types of mainstream compression coding manners in existing video compression coding standards such as chrominance sampling, predictive coding, transform coding, and quantization coding. The several encoding manners are separately described in detail below.

Chrominance sampling: This manner fully uses visual and psychological features of human eyes, and attempts to maximally reduce a data volume described by a single element starting from underlying data representation. For example, luminance-chrominance-chrominance (YUV) color coding is used in most television systems, and is a standard widely used in television systems in Europe. A YUV color space includes a luminance signal Y and two color difference signals U and V. The three components are independent of each other. A representation manner in which YUV color spaces are separate from each other is more flexible, occupies small bandwidth for transmission, and is advantageous over a conventional red green blue (RGB) color model. For example, a YUV 4:2:0 form indicates that a quantity of chrominance components U and V are only a half of a quantity of luminance components Y in both horizontal and vertical directions, that is, in four pixel sampling pixels, there are four luminance components Y and only one chrominance component U and one chrominance component V. When representation is performed in such a form, the data volume is further reduced and only accounts for 33% of an original data volume approximately. Therefore, chrominance sampling fully uses physiological and visual features of human eyes, and implementing video compression in such a chrominance sampling manner is one of video data compression manners widely used at present.

Predictive coding: during predictive coding, a currently to-be-encoded frame is predicted using data information of a previously encoded frame. A predicted value is obtained by means of prediction and is not exactly equal to an actual value. A residual value exists between the predicted value and the actual value. More accurate prediction indicates a predicted value closer to an actual value and a smaller residual value. In this way, a data volume can be greatly reduced by encoding the residual value. A matching image is restored or reconstructed by adding the residual value to the predicted value during decoding on a decoder side. This is a basic thinking method of the predictive coding. In a mainstream coding standard, the predictive coding is classified into two basic types such as intra prediction and inter prediction. The intra prediction (Intra Prediction) means that a pixel value of a pixel in a current encoding unit is predicated using a pixel value of a pixel in a reconstructed area in a current image. The inter prediction (Inter Prediction) means that a reconstructed image is searched for a matching reference block for a current encoding unit in a current image, a pixel value of a pixel in the reference block is used as predicted information or a predicted value of a pixel value of a pixel in the current encoding unit, and motion information of the current encoding unit is transmitted.

Transform coding: In this encoding manner, original spatial-domain information is not directly encoded. Instead, a sampled value of the information is converted from a current domain to another domain defined by a person (which is usually referred to as a transform domain) according to a transform function in a specific form, and then, compression coding is performed according to a distribution feature of the information in the transform domain. Because a data correlation of video image data is usually high in a spatial domain, massive redundant information exists, and if encoding is directly performed, a large quantity of bits are needed. However, after the sampled value of the information is converted into the transform domain, the data correlation is greatly lowered such that during encoding, because redundant information is reduced, a data volume required for the encoding is greatly reduced accordingly. In this way, a relatively high compression ratio can be obtained, and a relatively favorable compression effect can be achieved. Typical transform coding manners include Karhunen-Loeve (K-L) transform, Fourier transform, and the like.

Quantization coding: Data is not compressed in the transform coding mentioned above, the data can only be effectively compressed in a quantization process, and the quantization process is a major reason for a data "loss" in lossy compression. The quantization process is a process of "forcibly planning" an input value having a relatively large dynamic range into an output value having a relatively small dynamic range. A quantized input value has a relatively large range, and therefore, requires a relatively large quantity of bits for representation, while an output value obtained after "forcible planning" has a relatively small range, and therefore, requires only a small quantity of bits for representation.

In an encoding algorithm based on a hybrid coding architecture, the foregoing compression coding manners can be used in combination. An encoder control module selects, according to local features of different image blocks in a video frame, encoding modes used for the image blocks. Frequency domain prediction or spatial domain prediction is performed on a block on which intra prediction encoding is performed, and motion compensation prediction is performed on a block on which inter prediction encoding is performed. Then, transform and quantization processing are performed on a predicted residual to form a residual coefficient. At last, a final bitstream is generated using an entropy coder. To avoid accumulation of prediction errors, a reference signal of intra prediction or inter prediction is obtained using a decoding module on an encoder side. Dequantization and inverse transform are performed on the residual coefficient obtained after the transform and quantization, to reconstruct a residual signal. The residual signal is then added to the reference signal of prediction to obtain a reconstructed image. In addition, pixel correction is performed on the reconstructed image by means of loop filtering in order to improve encoding quality of the reconstructed image.

An entire video encoding/decoding process is briefly described below with reference to FIG. 1 and FIG. 2.

FIG. 1 is a schematic diagram of a video encoding process.

As shown in FIG. 1, when prediction is performed on a current image block in a current frame Fn, either intra prediction or inter prediction can be performed. Further, intra coding or inter coding may be selected according to a type of the current frame Fn. For example, if the current frame Fn is an I frame, the intra prediction is used; if the current frame Fn is a P frame or a B frame, the inter prediction is used. When the intra prediction is used, a pixel value of a pixel in the current image block can be predicted using a pixel value of a pixel in a reconstructed area in the current frame Fn. When the inter prediction is used, a pixel value of a pixel in the current image block can be predicted using a pixel value of a pixel in a reference block that is in a reference frame $F'_{n-1}$ and that matches the current image block.

After a predicted block of the current image block is obtained according to the inter prediction or the intra prediction, a difference between the pixel value of the pixel in the current image block and a pixel value of a pixel in the predicted block is calculated, to obtain residual information, and transform, quantization, and entropy coding are performed on the residual information, to obtain an encoded bitstream. In addition, in the encoding process, superposition also needs to be performed on the residual information of the current frame Fn and predicted information of the current frame Fn, and a filtering operation is performed, to obtain a reconstructed frame $F'_n$ of the current frame and use the reconstructed frame $F'_n$ as a reference frame for subsequent encoding.

Figure 2:
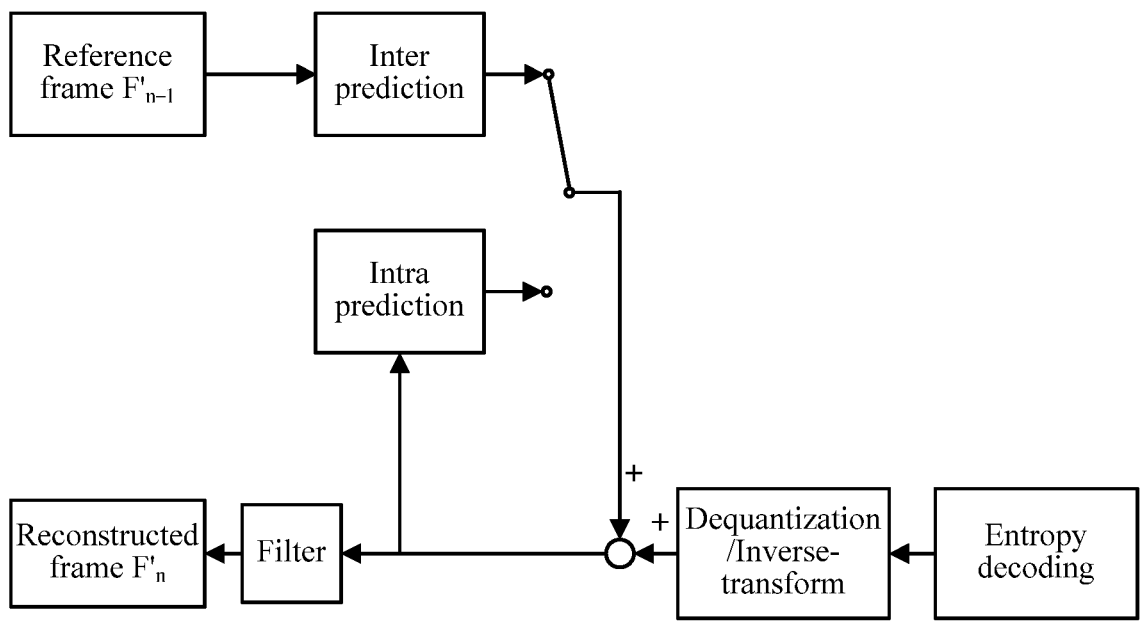
FIG. 2 is a schematic flowchart of a video decoding process.

FIG. 2 is a schematic diagram of a video decoding process.

The video decoding process shown in FIG. 2 is equivalent to an inverse process of the video encoding process shown in FIG. 1. During decoding, entropy decoding, dequantization, and inverse transform are used to obtain residual information, and whether intra prediction or inter prediction is used for a current image block is determined according to a decoded bitstream. In case of the intra prediction, predicted information is constructed using a pixel value of a pixel in a reconstructed area in a current frame and according to an intra prediction method. In case of the inter prediction, motion information needs to be parsed out, a reference block in a reconstructed image is determined using the motion information that is parsed out, a pixel value of a pixel in the reference block is used as predicted information, then superposition is performed on the predicted information and the residual information, and a filtering operation is performed to obtain reconstructed information.

Figure 3:
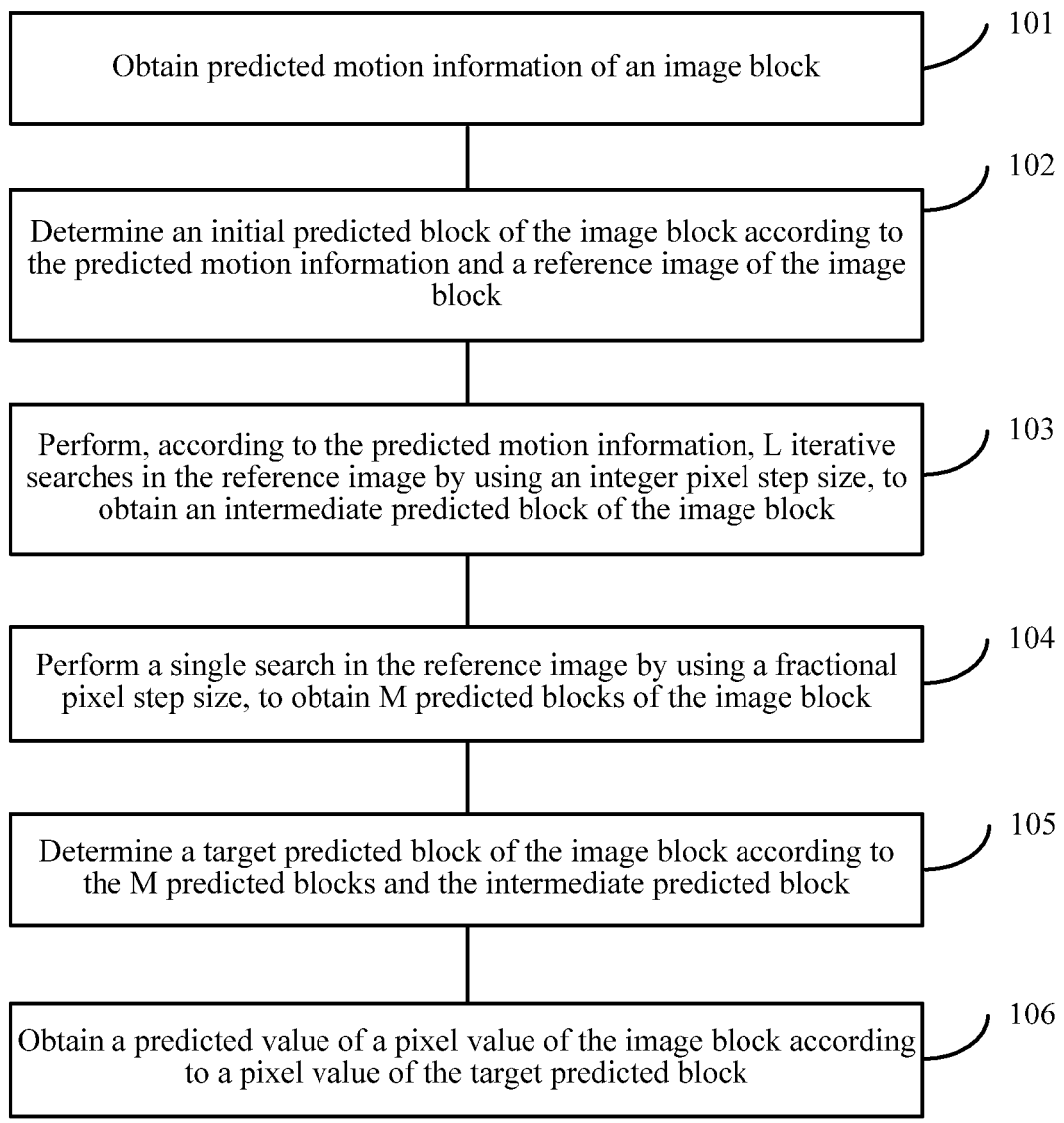
FIG. 3 is a schematic flowchart of an image prediction method according to an embodiment of this application.

FIG. 3 is a schematic flowchart of an image prediction method according to an embodiment of this application. The method shown in FIG. 3 may be performed by a video encoding and decoding apparatus, a video codec, a video encoding and decoding system, or another device having a video encoding and decoding function. The method shown in FIG. 3 may be performed in an encoding process or a decoding process. Further, the method shown in FIG. 3 may be performed in an inter prediction process during encoding or decoding.

The method shown in FIG. 3 includes step 101 to step 106, and step 101 to step 106 are described in detail below.

101: Obtain predicted motion information of an image block.

The image block herein may be an image block in a to-be-processed image or a sub-image in a to-be-processed image. In addition, the image block herein may be a to-be-encoded image block in an encoding process or a to-be-decoded image block in a decoding process.

Moreover, the predicted motion information may include indication information of a prediction direction (which usually is forward prediction, backward prediction, or bidirectional prediction), a motion vector toward a reference image block (which usually is a motion vector of an adjacent block), and information about an image in which the reference image block is located (which is usually understood as reference image information). The motion vector includes a forward motion vector and/or a backward motion vector, and the reference image information includes reference frame index information of a forward prediction reference image block and/or a backward prediction reference image block.

When the predicted motion information of the image block is obtained, the following manners may be used. For example, the predicted motion information of the image block may be obtained in the following manner 1 and manner 2.

Manner 1

Figure 4:
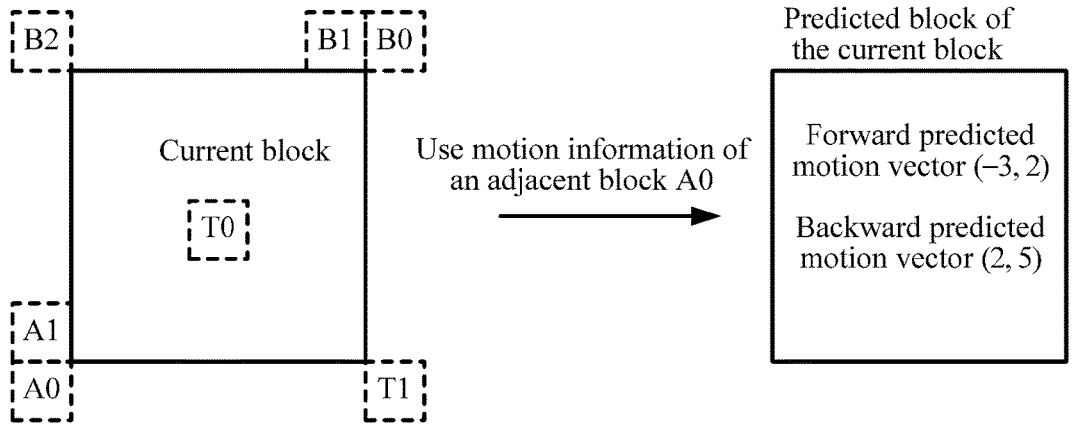
FIG. 4 is a schematic diagram of selecting a motion vector of a predicted block of a current image block in merge mode of inter prediction.

In merge mode of inter prediction, a candidate predicted motion information list is constructed according to motion information of an adjacent block of a current image block, and a specific piece of candidate predicted motion information is selected from the candidate predicted motion information list as predicted motion information of the current image block. The candidate predicted motion information list includes a motion vector, reference frame index information of a reference image block, and the like. As shown in FIG. 4, motion information of an adjacent block A0 is selected as the predicted motion information of the current image block. Further, a forward motion vector of A0 is used as a forward predicted motion vector of the current image block, and a backward motion vector of A0 is used as a backward predicted motion vector of the current image block.

Manner 2

Figure 5:
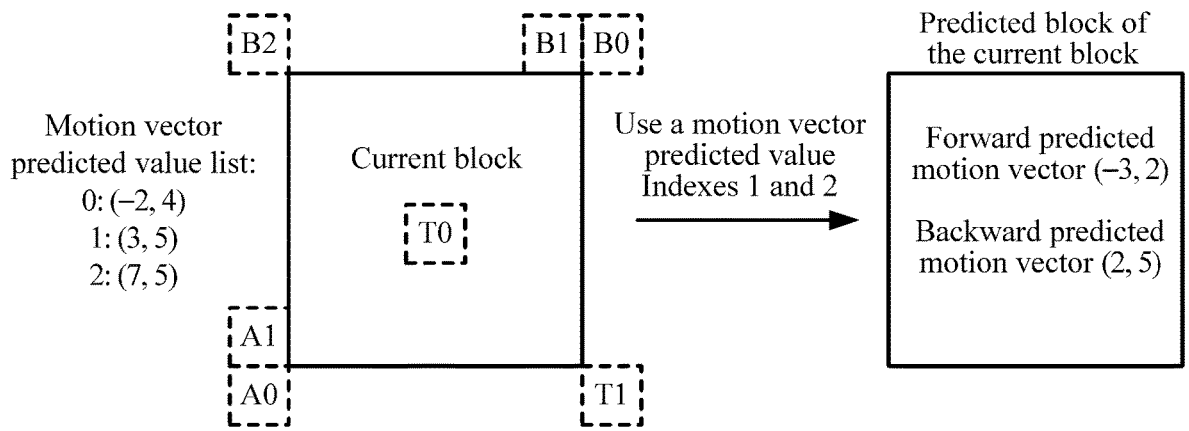
FIG. 5 is a schematic diagram of selecting a motion vector of a predicted block of a current image block in non-merge mode of inter prediction.

In non-merge mode of inter prediction, a motion vector predicted value list is constructed according to motion information of an adjacent block of a current image block, and a specific motion vector is selected from the motion vector predicted value list as a motion vector predicted value of the current image block. In this case, a motion vector of the current image block may be a motion vector value of the adjacent block or a sum of differences between motion vectors of selected adjacent blocks and the motion vector of the current image block. The motion vector difference is a difference between a motion vector obtained by performing motion estimation on the current image block and the motion vector of the selected adjacent block. As shown in FIG. 5, motion vectors, corresponding to indexes 1 and 2, in the motion vector predicted value list are selected as a forward motion vector and a backward motion vector of the current image block.

It should be understood that the foregoing manner 1 and manner 2 are merely two specific manners of obtaining the predicted motion information of the image block. In this application, a manner of obtaining motion information of a predicted block is not limited, and any manner in which the predicted motion information of the image block can be obtained shall fall within the protection scope of this application.

102: Determine an initial predicted block of the image block according to the predicted motion information and a reference image of the image block.

It should be understood that the reference image may be a reference image of the image block, or the reference image is a reference image of a to-be-processed image in which the image block is located. The reference image may be determined in a manner in other approaches or may be determined by a user according to a rule preset.

Because the reference image only has a pixel value of an integer pixel position, if a position to which a motion vector points is a fractional pixel (which may also be referred to as a fractional pixel or a sub-pixel) position (for example, a ½ pixel position), interpolation needs to be performed using the pixel value of the integer pixel position of the reference image and using an interpolation filter, to obtain a pixel value of the fractional pixel position as a pixel value of a predicted block. During an interpolation operation, because of a gain of the interpolation filter, a bit width of the pixel value of the predicted block is larger than a bit width of a reconstructed pixel value of a finally obtained image block. The reconstructed pixel value of the image block herein may be a pixel value of a reconstructed block obtained by reconstructing the image block.

For example, when the bit width of the pixel value of the reference image is 8 bits, and the gain of the interpolation filter is 6 bits, a predicted block having a pixel value whose bit width is 14 bits is obtained. When the bit width of the pixel value of the reference image is 10 bits, and the gain of the interpolation filter is 6 bits, a predicted block having a pixel value whose bit width is 16 bits is obtained.

To maintain a bit width of a pixel value obtained after the interpolation at a specific numeral value, a shift operation may be further performed after the interpolation operation is performed. For example, when the bit width of the pixel value of the reference image is 10 bits, and the gain of the interpolation filter is 6 bits, to make the bit width of the pixel value of the obtained predicted block be 14 bits, the pixel value obtained after the interpolation operation is shifted right by 2 bits in order to obtain the predicted block having the pixel value whose bit width is 14 bits.

As shown FIG. 6, Ai,j is a pixel at an integer pixel position, and a bit width thereof is bitDepth. a0,0, b0,0, c0,0, d0,0, h0,0, n0,0 e0,0, i0,0, p0,0, f0,0, j0,0, q0,0, g0,0, k0,0, and r0,0 are pixels at fractional pixel positions. If an 8-tap interpolation filter is used, a0,0 can be obtained by means of calculation using the following formula:

$$a0,0 = (C_0 * A_{-3,0} + C_1 * A_{-2,0} + C_2 * A_{-1,0} + C_3 * A_{0,0} + C_4 * A_{1,0} + C_5 * A_{2,0} + C_6 * A_{3,0} + C_7 * A_{4,0}) >> \text{shift1}$$

In the foregoing formula, $C_k$ is a coefficient of the interpolation filter, where k=0, 1, . . . , or 7, and if a sum of coefficients of the interpolation filter is 2 raised to the power of N, the gain of the interpolation filter is N. For example, N being 6 indicates that the gain of the interpolation filter is 6 bits. shift1 is a quantity of bits of a right shift, and shift1 may be set to bitDepth-8, where bitDepth is a target bit width. In this way, according to the foregoing formula, a bit width of a pixel value of a finally obtained predicted block is bitDepth+6-shift1=14 bits.

The foregoing bitDepth is the target bit width, the target bit width is a bit width that a reconstructed pixel value of an image block needs to reach after image prediction is ended, and the target bit width may be obtained in a manner regulated in an existing standard.

103: Perform, according to the predicted motion information, L iterative searches in the reference image using an integer pixel step size, to obtain an intermediate predicted block of the image block.

L is a preset value and is an integer greater than 1. L may be a numeral value that has been preset before prediction is performed on an image. Alternatively, a numeral value of L may be set according to precision of image prediction and complexity in searching for a predicted block. Alternatively, L may be set according to a historical empirical value. Alternatively, L may be determined according to verification on a result of an intermediate search process.

Optionally, in step 103, during each iterative search, multiple predicted blocks can be searched for. The multiple predicted blocks obtained in each search are compared with the initial predicted block, a predicted block, in the multiple predicted blocks, having a pixel value whose difference from a pixel value of the initial predicted block is the smallest is determined as an intermediate predicted block, and after the intermediate predicted block is obtained in each search, the initial predicted block is updated according to the intermediate predicted block, that is, the intermediate predicted block is directly determined as the initial predicted block.

For example, in step 103, a total of three searches are performed using the integer pixel step size. During the first search, multiple predicted blocks can be found, and the multiple predicted blocks are compared with the initial predicted block in step 102, to obtain an intermediate predicted block in the first search. Then, the intermediate predicted block is directly determined as the initial predicted block. Subsequently, the second search is performed, and likewise, multiple predicted blocks are searched for, the multiple predicted blocks are compared with the initial predicted block (the initial predicted block herein is actually the intermediate predicted block obtained in the first search), to obtain an intermediate predicted block in the second search, and then, the intermediate predicted block is directly determined as the initial predicted block. Subsequently, the third search is performed, likewise, multiple predicted blocks are searched for, and the multiple predicted blocks are compared with the initial predicted block (the initial predicted block herein is actually the intermediate predicted block obtained in the second search), to obtain an intermediate predicted block in the third search. It should be understood that the intermediate predicted block in the third search is the finally obtained intermediate predicted block in step 103.

Optionally, in an embodiment, the performing, according to the predicted motion information, L iterative searches in the reference image using an integer pixel step size further includes repeatedly performing the following step 1 to step 3 a total of L times, to use a finally obtained initial predicted block as the intermediate predicted block such as step 1: obtaining current predicted motion information, where when step 1 is performed for the first time, the current predicted motion information is predicted motion information of the image block, and when step 1 is performed for the $i^{th}$ time, the current predicted motion information is information about motion of the image block toward a current initial predicted block, where i is an integer less than or equal to L and greater than 1; step 2: performing, according to the current predicted motion information, a search in the reference image using the integer pixel step size, to obtain N predicted blocks corresponding to the image block, where N is a preset value and is an integer greater than 1; and step 3: obtaining a new current initial predicted block according to the N predicted blocks and the current initial predicted block.

It should be understood that in a process of the L iterative searches, a new current initial predicted block is obtained in each iterative search. In each iterative search, the new current initial predicted block is obtained according to N predicted blocks and a current initial predicted block obtained in a previous iterative search, and the new current initial predicted block is used as a current initial predicted block during a next iterative search.

For example, if a first initial predicted block is obtained in the first iterative search, during the second iterative search, a second initial predicted block corresponding to the second search can be obtained according to N predicted blocks and the first initial predicted block.

An intermediate predicted block whose pixel value is relatively close to the pixel value of the image block can be determined by performing multiple iterative searches.

Optionally, in an embodiment, when the reference image includes a first direction reference image and a second direction reference image, when each iterative search is performed in the reference image using the integer pixel step size, the N predicted blocks corresponding to the image block can be obtained, and then, a new current initial predicted block can be obtained according to the N predicted blocks obtained by means of the search. Further, step 4 to step 9 are included.

Step 4: Perform a search in the first direction reference image using the integer pixel step size, to obtain the N predicted blocks corresponding to the image block.

Step 5: Determine, in the N predicted blocks corresponding to the image block, a predicted block having a pixel value whose difference from a pixel value of the current initial predicted block is the smallest as a first initial predicted block.

Step 6: Determine a first motion vector of the image block toward the first initial predicted block.

Step 7: Determine a second motion vector according to the first motion vector and according to a preset rule.

Step 8: Determine, in the second direction reference image according to the second motion vector, a second initial predicted block corresponding to the image block.

Step 9: Determine a new current initial predicted block according to the first initial predicted block and the second initial predicted block.

The first direction reference image and the second direction reference image are respectively a forward reference image and a backward reference image, or the first direction reference image and the second direction reference image are respectively a backward reference image and a forward reference image.

A predicted block of an image block in a reference image in another direction is derived from a predicted block that is obtained by means of a search in a reference image in a direction such that a large quantity of search operations can be omitted, and complexity during image prediction is reduced. Moreover, because both a predicted block that corresponds to the image block and that is in a forward reference image and a predicted block that corresponds to the image block and that is in a backward reference image are used when the target predicted block is determined, accuracy of image prediction can be ensured while reducing complexity of the image prediction.

It should be understood that during each search process of the iterative searches, a predicted block may be searched for only in a forward reference image, and then, a new current initial predicted block is determined according to at least one forward predicted block that is found; or a predicted block may be searched for only in a backward reference image, and then, a new current initial predicted block is determined according to at least one backward predicted block that is found.

Alternatively, at least one forward predicted block may be searched for in a forward reference image, at least one backward predicted block may be searched for in a backward reference image, a first initial predicted block is obtained according to the at least one forward predicted block, a second initial predicted block is obtained according to the at least one backward predicted block, and then, a new initial predicted block is obtained according to the first initial predicted block and the second initial predicted block.

104: Perform a single search in the reference image using a fractional pixel step size, to obtain M predicted blocks of the image block.

M is a preset value and is an integer greater than 1.

Optionally, K iterative searches can be performed in the reference image using the fractional pixel step size. A numeral value of K is less than that of L. For example, a quantity of searches performed using the fractional pixel step size is less than a quantity of searches performed using the integer pixel step size. In this way, because the quantity of iterative searches performed using the fractional pixel step size is less than the quantity of iterative searches performed using the integer pixel step size, complexity of image prediction can be reduced to some extent.

105: Determine a target predicted block of the image block according to the M predicted blocks and the intermediate predicted block.

When the reference image includes a first direction reference image and a second direction reference image, step 104 and step 105 may further include step 10 to step 15.

Step 10: Perform a search in the first direction reference image using the fractional pixel step size, to obtain the M predicted blocks corresponding to the image block.

Step 11: Determine, in the M predicted blocks corresponding to the image block, a predicted block having a pixel value whose difference from a pixel value of the intermediate predicted block is the smallest as a first target predicted block.

Step 12: Determine a first motion vector of the image block toward the first target predicted block.

Step 13: Determine a second motion vector according to the first motion vector and according to a preset rule.

Step 14: Determine, in the second direction reference image according to the second motion vector, a second target predicted block corresponding to the image block.

Step 15: Determine the target predicted block according to the first target predicted block and the second target predicted block.

The first direction reference image and the second direction reference image are respectively a forward reference image and a backward reference image, or the first direction reference image and the second direction reference image are respectively a backward reference image and a forward reference image.

A predicted block of an image block in a reference image in another direction is derived from a predicted block that is obtained by means of a search in a reference image in a direction such that a large quantity of search operations can be omitted, and complexity during image prediction is reduced. Moreover, because both a predicted block that corresponds to the image block and that is in a forward reference image and a predicted block that corresponds to the image block and that is in a backward reference image are used when the target predicted block is determined, accuracy of image prediction can be ensured while reducing complexity of the image prediction.

Optionally, in an embodiment, before the determining a second motion vector of the image block toward the second direction reference image according to the first motion vector, the method shown in FIG. 3 further includes determining that a distance between the image block and the first direction reference image is less than or equal to a distance between the image block and the second direction reference image.

When the distance between the image block and the first direction reference image is relatively short, a search is performed in the first direction reference image such that complexity of the search can be reduced.

106: Obtain a predicted value of a pixel value of the image block according to a pixel value of the target predicted block.

In this application, after multiple iterative searches are performed using the integer pixel step size, based on results of the iterative searches performed using the integer pixel step size, a search is further performed using the fractional pixel step size, and a target predicted block is determined based on predicted blocks obtained by means of the search performed using the fractional pixel step size. Compared with a manner of performing searches using the integer pixel step size and the fractional pixel step size alternately, a volume of read data can be reduced in a search process and complexity of image prediction can be reduced.

Optionally, in an embodiment, the determining an initial predicted block of the image block according to the predicted motion information and a reference image of the image block further includes obtaining, in the reference image using an interpolation filter according to the predicted motion information, a first predicted block and a second predicted block that correspond to the image block, where a gain of the interpolation filter is greater than 1; and obtaining the initial predicted block according to the first predicted block and the second predicted block, where pixel values of the initial predicted block, the first predicted block, and the second predicted block all have a same bit width.

The first predicted block and the second predicted block whose pixel values have relatively large bit widths can be obtained using the interpolation filter. In this way, the initial predicted block can be determined more accurately according to the first predicted block and the second predicted block whose pixel values have relatively large bit widths.

Optionally, in an embodiment, bit widths of pixel values of the intermediate predicted block and the target predicted block are both the same as a bit width of a pixel value of the initial predicted block.

Because the pixel value of the initial predicted block has a relatively large bit width, and the bit widths of the pixel values of the intermediate predicted block and the target predicted block are the same as the bit width of the pixel value of the initial predicted block, that is, for the intermediate predicted block, the initial predicted block, and the target predicted block, the pixel values are all indicated using the relatively large bit widths, accuracy of image prediction can be improved using a pixel value having a relatively large bit width in an image prediction process.

Optionally, in an embodiment, the determining an initial predicted block of the image block according to the predicted motion information and a reference image of the image block includes obtaining, in the reference image using an interpolation filter according to the predicted motion information, a first predicted block and a second predicted block that correspond to the image block, where a gain of the interpolation filter is greater than 1; performing a shift operation on a pixel value of the first predicted block and a pixel value of the second predicted block, to reduce bit widths of the pixel values of the first predicted block and the second predicted block to a target bit width, where the target bit width is a bit width of a reconstructed pixel value of the image block; and obtaining the initial predicted block according to the first predicted block and the second predicted block, where a bit width of a pixel value of the initial predicted block is the target bit width.

The obtaining the initial predicted block according to the first predicted block and the second predicted block may be obtaining the pixel value of the initial predicted block according to the pixel value of the first predicted block and the pixel value of the second predicted block.

Optionally, the obtaining the initial predicted block according to the first predicted block and the second predicted block includes performing weighted processing on the pixel values of the first predicted block and the second predicted block, to obtain the pixel value of the initial predicted block.

Optionally, when the bit width of the pixel value of the initial predicted block is the target bit width, the bit widths of the pixel values of the intermediate predicted block and the target predicted block are both the target bit width.

Because all of the bit widths of the pixel values of the initial predicted block, the intermediate predicted block, and the target predicted block are the target bit width, in a process of performing prediction on an image, conversions of a pixel value between different bit widths can be reduced, and the predicted value of the pixel value of the image block is determined according to the target predicted block having the pixel value whose bit width is the target bit width, instead of determining the predicted value of the pixel value of the image block after performing motion compensation to obtain a predicted block whose pixel value has a large bit width such that an operation of motion compensation is omitted, a process of image prediction is simplified, and complexity of the image prediction is reduced.

In addition, when the first predicted block and the second predicted block are obtained in the reference image according to the predicted motion information, positions of the first predicted block and the second predicted block in the reference image of the to-be-processed image may be further determined according to the first motion vector and the second motion vector that are included in the predicted motion information. Besides, the first predicted block and the second predicted block may be obtained in the reference image in a motion compensation manner according to the motion vectors included in the predicted motion information.

Optionally, in an embodiment, the method shown in FIG. 3 further includes determining a motion vector of the image block according to the motion vector of the image block toward the target predicted block.

It should be understood that the motion vector toward the target predicted block herein is the motion vector of the image block toward the target predicted block.

Determining a motion vector of the image block according to the motion vector toward the target predicted block may be further directly determining a motion vector of a target motion block as the motion vector of the image block, that is, updating motion vector of the image block such that when image prediction is performed next time, effective prediction can be performed on another image block according to the image block. In addition, the motion vector of the target motion block may be determined as a predicted value of the motion vector of the image block, and then, the motion vector of the image block is obtained according to the predicted value of the motion vector of the image block.

When the reference image is a forward reference image, in step 102, when the initial predicted block is determined, two forward predicted blocks may be first determined in the forward reference image according to the predicted motion information, and then, the initial predicted block is determined according to the two forward predicted blocks. The pixel value of the initial predicted block is obtained by performing weighted processing on the two forward predicted blocks.

In this application, the weighted processing mentioned above is merely a manner of obtaining a pixel value of a predicted block (including various predicted blocks such as the initial predicted block and the target predicted block). In addition to obtaining a pixel value of a predicted block by means of the weighted processing, a pixel value of a predicted block (including various predicted blocks such as the initial predicted block and the target predicted block) can be obtained in another manner. This is not limited in this application.

It should be understood that when the reference image is a backward reference image, a manner of determining the initial predicted block and the target predicted block is similar to the manner that is used when the reference image is a forward reference image. For brevity, repeated descriptions are appropriately omitted herein.

Optionally, in an embodiment, the reference image includes a forward reference image and a backward reference image of the to-be-processed image.

In this application, when the reference image includes a forward reference image and a backward reference image, the target predicted block is determined by searching both the forward reference image and the backward reference image such that accuracy of image prediction can be improved.

When the reference image includes a forward reference image and a backward reference image, step 102 may further include step 16 to step 21.

Step 16: Obtain, in the forward reference image according to the predicted motion information, a forward predicted block of the image block in a motion compensation manner.

Step 17: Obtain, in the backward reference image according to the predicted motion information, a backward predicted block of the image block in a motion compensation manner.

Step 18: Perform weighted processing on a pixel value of the forward predicted block and a pixel value of the backward predicted block, and use a pixel value obtained after the weighted processing as a pixel value of the initial predicted block, to further obtain the initial predicted block.

It should be understood that there is no sequential order between step 16 and step 17. Step 16 may be performed first, or step 17 may be performed first, or step 16 and step 17 may be performed at the same time.

When the reference image includes a forward reference image and a backward reference image, step 102 may further include the following several steps.

Step 19: Perform a search in the forward reference image to obtain at least one forward predicted block (a pixel value of each forward predicted block has a large bit width), and determine, in the at least one forward predicted block, a forward predicted block having a pixel value whose difference from a pixel value of the initial predicted block is the smallest as a forward target predicted block.

Step 20: Perform a search in the backward reference image to obtain at least one backward predicted block (a pixel value of each backward predicted block has a large bit width), and determine, in the at least one backward predicted block, a backward predicted block having a pixel value whose difference from a pixel value of the initial predicted block is the smallest as a backward target predicted block.

Step 21: Perform weighted processing on the pixel value of the forward target predicted block and the pixel value of the backward target predicted block, to obtain a pixel value of a target predicted block.

Because the bit widths of the pixel values of the forward predicted block and the backward predicted block in step 19 and step 20 are both large bit widths, bit widths of the pixel values of the forward target predicted block and the backward target predicted block that are obtained in step 19 and step 20 are also large bit widths. In this way, a bit width of the pixel value of the target predicted block obtained in step 21 according to the forward target predicted block and the backward target predicted block is also a large bit width.

In addition, in step 19 and step 20, when the difference between the pixel value of the forward predicted block and the pixel value of the initial predicted block is determined through comparison, and the difference between the pixel value of the backward predicted block and the pixel value of the initial predicted block is determined through comparison, a difference between a pixel value of each forward predicted block or a pixel value of each backward predicted block and the pixel value of the initial predicted block may be measured using a sum of absolute differences (SAD), a sum of absolute transform differences (SATD), or a sum of absolute square differences.

The reference image of the image block may include only a forward reference image, or may include only a backward reference image, or includes both a forward reference image and a backward reference image.

Optionally, in an embodiment, the obtaining, in the reference image using an interpolation filter according to the predicted motion information, a first predicted block and a second predicted block that correspond to the image block further includes the following three situations, such as (1) when the reference image is a forward reference image, obtaining the first predicted block and the second predicted block in the forward reference image using the interpolation filter according to the predicted motion information; (2) when the reference image is a backward reference image, obtaining the first predicted block and the second predicted block in the backward reference image using the interpolation filter according to the predicted motion information; and (3) when the reference image includes a forward reference image and a backward reference image, obtaining the first predicted block and the second predicted block respectively in the forward reference image and the backward reference image using the interpolation filter according to the predicted motion information.

Different predicted blocks are obtained in the forward reference image and/or the backward reference image, to further determine the initial predicted block according to the different predicted blocks. Compared with a manner of directly using a predicted block that is found in the forward reference image or the backward reference image as the initial predicted block, the initial predicted block can be more accurately determined according to the different predicted blocks.

Optionally, when the reference image includes only a forward reference image or only a backward reference image, the performing a search in the reference image according to the predicted motion information, to obtain M predicted blocks corresponding to the image block further includes the following two situations.

Optionally, in an embodiment, the performing a single search in the reference image using a fractional pixel step size, to obtain M predicted blocks of the image block includes (4) when the reference image is a forward reference image, performing a search in the forward reference image according to the predicted motion information, to obtain the M predicted blocks corresponding to the image block; and (5) when the reference image is a backward reference image, performing a search in the backward reference image according to the predicted motion information, to obtain the M predicted blocks corresponding to the image block.

A search is performed in only one reference image (a forward reference image or a backward reference image), to obtain the M predicted blocks such that complexity in searching for predicted blocks is reduced. In addition, a predicted block closer to the image block can be obtained by determining through comparison a difference between a pixel value of each of the M predicted blocks and the pixel value of the initial predicted block in order to improve an image prediction effect.

When the reference image includes only a forward reference image or only a backward reference image, the M predicted blocks are obtained by searching the forward reference image or obtained by searching the backward reference image. Subsequently, when the target predicted block of the image block is determined according to the M predicted blocks corresponding to the image block and the initial predicted block, the predicted block, in the M predicted blocks, having the pixel value whose difference from the pixel value of the initial predicted block is the smallest may be determined as the target predicted block.

Optionally, when the reference image includes both a forward reference image and a backward reference image, a specific process of performing a single search in the reference images using a fractional pixel step size, to obtain M predicted blocks of the image block includes performing a search in the forward reference image according to the predicted motion information, to obtain A predicted blocks corresponding to the image block; and performing a search in the backward reference image according to the predicted motion information, to obtain B predicted blocks corresponding to the image block; and The determining a target predicted block of the image block according to the M predicted blocks corresponding to the image block and the initial predicted block includes determining, in the A predicted blocks, a predicted block having a pixel value whose difference from the pixel value of the initial predicted block is the smallest as the first target predicted block; determining, in the B predicted blocks, a predicted block having a pixel value whose difference from the pixel value of the initial predicted block is the smallest as the second target predicted block; and determining the target predicted block according to the first target predicted block and the second target predicted block.

A and B are both integers greater than 0, A+B=M, and A and B may be the same or different.

Searches are respectively performed in the forward reference image and the backward reference image such that a final target block can be comprehensively determined according to the predicted blocks found in the forward reference image and the backward reference image. In this way, both the forward reference image and the backward reference image are considered when the predicted block is obtained such that the finally obtained target predicted block is closer to the image block, thereby improving an image prediction effect.

To describe specific processes of performing a search using the integer pixel step size and performing a search using the fractional pixel step size in further detail, the image prediction method in this embodiment of this application is described in detail below with reference to FIG. 7A and FIG. 7B.

Figure 7A:
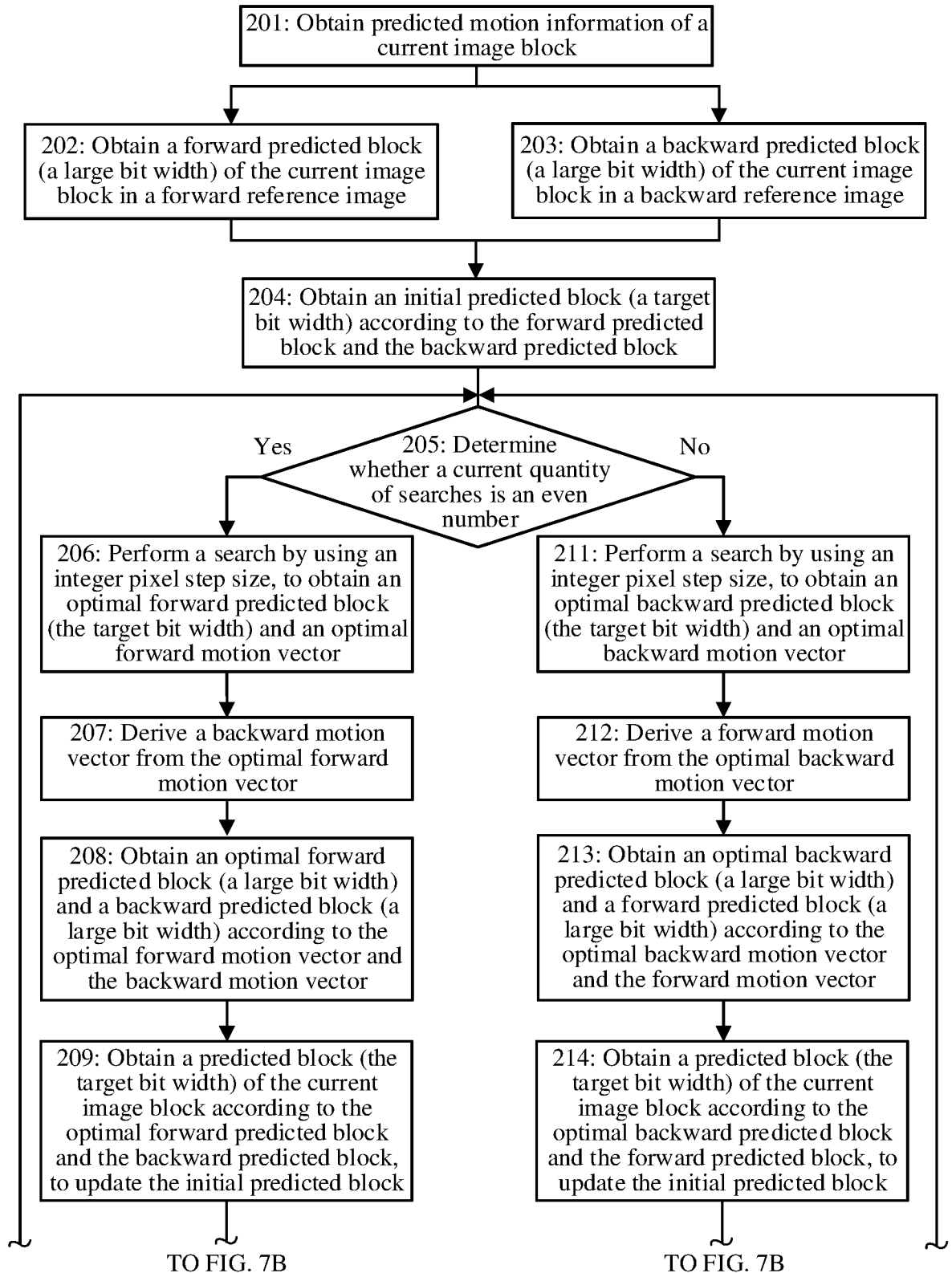
FIG. 7A and FIG. 7B are a schematic flowchart of an image prediction method according to an embodiment of this application.
Figure 7B:
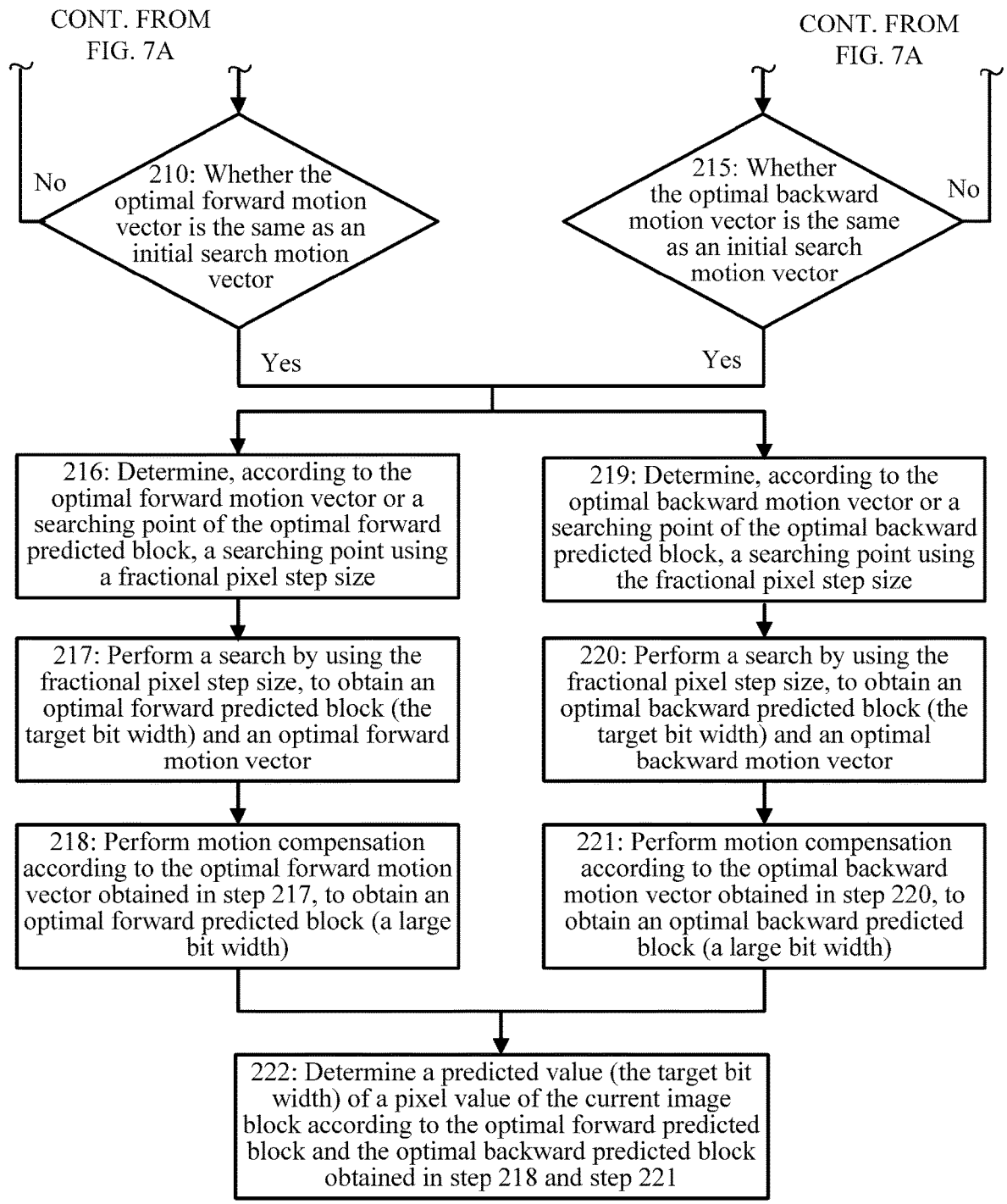

FIG. 7A and FIG. 7B are a schematic flowchart of an image prediction method according to an embodiment of this application. The method shown in FIG. 7A and FIG. 7B may be performed by a video encoding and decoding apparatus, a video codec, a video encoding and decoding system, or another device having a video encoding and decoding function. The method shown in FIG. 7A and FIG. 7B may be performed in an encoding process or a decoding process. Further, the method shown in FIG. 7A and FIG. 7B may be performed in an inter prediction process during encoding or decoding.

The method shown in FIG. 7A and FIG. 7B includes step 201 to step 222, and step 201 to step 222 are described in detail below.

201: Obtain predicted motion information of a current image block.

When the predicted motion information is obtained, further, the predicted motion information of the current image block may be determined according to motion information of an adjacent image block of the current image block. Further, the predicted motion information may alternatively be obtained in manner 1 and manner 2 below step 101.

When a reference image of the current image block includes a forward reference image and a backward reference image, the predicted motion information includes indication information of a prediction direction (which usually is forward prediction, backward prediction, or bidirectional prediction), a motion vector toward a reference image block (which usually is a motion vector of an adjacent block), and information about an image in which the reference image block is located (which is usually understood as reference image information). The motion vector includes a forward motion vector and/or a backward motion vector, and the reference image information includes reference frame index information of a forward prediction reference image block and/or a backward prediction reference image block.

202: Obtain a forward predicted block (a large bit width) of the current image block in a forward reference image.

203: Obtain a backward predicted block (a large bit width) of the current image block in a backward reference image.

Bit widths of pixel values of the forward predicted block and the backward predicted block in step 202 and step 203 are both large bit widths. In this application, a pixel value having a large bit width is a pixel value whose bit width is larger than a target bit width. The target bit width is a bit width whose pixel value is a reconstructed pixel value of the image block. For example, if the bit widths of the pixel values of the forward predicted block and the backward predicted block in step 202 and step 203 are both 14 bits, and the target bit width is 10 bits, because the bit widths of the pixel values of the forward predicted block and the backward predicted block are larger than the target bit width, the pixel values of the forward predicted block and the backward predicted block may be referred to as pixel values having large bit widths.

It should be understood that the predicted motion information in step 201 may further include a forward motion vector and a backward motion vector. In this way, in step 202 and step 203, the forward predicted block of the current image block may be obtained in the forward reference image using a motion compensation method according to the forward motion vector, and the backward predicted block of the current image block may be obtained in the backward reference image using a motion compensation method according to the backward motion vector.

It should be understood that after the forward predicted block and the backward predicted block are obtained in step 202 and step 203, no bit width shift and limiting operation is performed on the pixel values of the forward predicted block and the backward predicted block such that the pixel values of the forward predicted block and the backward predicted block are maintained at large bit widths.

Optionally, after the forward predicted block and the backward predicted block are obtained in step 202 and step 203, no bit width shift and limiting operation is performed on the pixel values of the forward predicted block and the backward predicted block such that the pixel values of the forward predicted block and the backward predicted block are the target bit width.

204: Obtain an initial predicted block (a target bit width) according to the forward predicted block and the backward predicted block.

A bit width of a pixel value of the initial predicted block is the target bit width.

It should be understood that the forward predicted block and the backward predicted block in step 204 are respectively obtained in step 202 and step 203, and the pixel value of the forward predicted block and the pixel value of the backward predicted block are pixel values having large bit widths.

When the initial predicted block is obtained according to the forward predicted block and the backward predicted block, weighted processing may be performed on the pixel value of the forward predicted block and the pixel value of the backward predicted block, and an obtained pixel value is determined as the pixel value of the initial predicted block (which may also be referred to as a matching predicted block). It should be understood that after the weighted processing is performed on the pixel value of the forward predicted block and the pixel value of the backward predicted block, no bit width shift and limiting operation is performed on the pixel value obtained after the weighted processing such that the pixel value of the obtained initial predicted block also has a large bit width.

When the weighted processing is performed on the pixel value of the forward predicted block and the pixel value of the backward predicted block, a pixel value of each pixel in the initial predicted block may be obtained according to a formula (1):

$$\text{predSamples}[x][y]=(\text{predSamples}L0[x][y]+\text{predSamples}L1[x][y]+1)\gg 1 \quad (1)$$

In the formula (1), predSamplesL0 is a forward predicted block, predSamplesL1 is a backward predicted block, predSamples is an initial predicted block, predSamplesL0[x][y] is a pixel value of a pixel (x, y) in the forward predicted block, predSamplesL1[x][y] is a pixel value of a pixel (x, y) in the backward predicted block, and predSamples[x][y] is a pixel value of a pixel (x, y) in the initial predicted block.

When the bit widths of the pixel value of the forward predicted block and the pixel value of the backward predicted block are both 14 bits, the bit width of the pixel value of the initial predicted block that is obtained according to the formula (1) is also 14 bits. For example, the pixel value of the pixel in the initial predicted block is calculated according to the formula (1) such that the bit width of the pixel value of the pixel in the initial predicted block and the bit widths (both large bit widths) of the forward predicted block and the backward predicted block can maintain consistent.

205: Determine whether a current quantity of searches is an even number.

If the current quantity of searches is an even number, step 206 is performed, and if the current quantity of searches is an odd number, step 211 is performed. for example, when an odd-numbered iterative search is performed, the search is performed in the forward reference image using an integer pixel step size, and when an even-numbered iterative search is performed, the search is performed in the backward reference image using the integer pixel step size. Certainly, alternatively, when an odd-numbered iterative search is performed, the search may be performed in the backward reference image using the integer pixel step size, and when an even-numbered iterative search is performed, the search may be performed in the forward reference image using the integer pixel step size.

206: Perform a search using an integer pixel step size, to obtain an optimal forward predicted block (the target bit width) and an optimal forward motion vector.

A bit width of a pixel value of the optimal forward predicted block is a large bit width. When the optimal forward predicted block is obtained, at least one forward predicted block can be found using the integer pixel step size, and then, a forward predicted block, in the at least one forward predicted block, having a pixel value whose difference from the pixel value of the initial predicted block is the smallest is determined as the optimal forward predicted block.

Further, an SAD between a pixel value of each of multiple forward predicted blocks and the pixel value of the initial predicted block may be determined through comparison. A forward predicted block having the smallest SAD and a forward motion vector corresponding thereto are selected as the optimal forward predicted block and the optimal forward motion vector corresponding thereto. A forward predicted block having the second smallest SAD and a forward motion vector corresponding thereto are selected as a second optimal forward predicted block and a second optimal forward motion vector corresponding thereto.

It should be understood that when a search is performed using the integer pixel step size, a search starting point may be an integer pixel or may be a fractional pixel, for example, an integer pixel, a ½ pixel, a ¼ pixel, a ⅛ pixel, or a 1/16 pixel.

Figure 8:
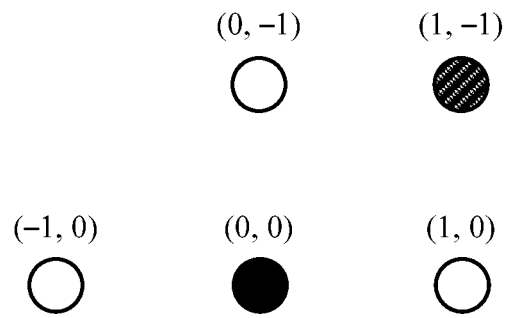
FIG. 8 is a schematic diagram of a search starting point.

For example, as shown in FIG. 8, when a search is performed using the integer pixel step size, a forward predicted block may be obtained using (0,0) as a search starting point. Subsequently, the search continues using five pixels as searching points around (0, 0), to further obtain five forward predicted blocks. The search is performed using searching points that are around the search starting point and whose distances from the search starting point are five integer pixel step sizes, to obtain corresponding predicted blocks. Subsequently, the sixth search may further be performed. During the sixth search, a searching point may be any position of (−1, −1), (−1, 1), (1, −1), and (1, 1).

In addition, the optimal forward motion vector may be a motion vector of the current image block toward the optimal forward predicted block.

207: Derive a backward motion vector from the optimal forward motion vector.

Further, the backward motion vector may be derived according to the formula: MV1'=MV1−(MV0'−MV0). MV1 is the initial backward motion vector, MV0' is the optimal forward motion vector, and MV0 is an initial forward motion vector.

208: Obtain an optimal forward predicted block (a large bit width) and a backward predicted block (a large bit width) according to the optimal forward motion vector and the backward motion vector.

209: Obtain a predicted block (the target bit width) of the current image block according to the optimal forward predicted block and the backward predicted block, to update the initial predicted block.

For example, the predicted block of the current image block that is obtained according to the optimal forward predicted block and the backward predicted block can be directly determined as a new initial predicted block.

210: Determine whether the optimal forward motion vector is the same as an initial motion vector.

If the optimal forward motion vector is the same as the initial search motion vector, the iterative search is stopped, and step 216 is performed. If the optimal forward motion vector is different from the initial search motion vector, step 206 is performed, and the iterative search continues.

211: Perform a search using an integer pixel step size, to obtain an optimal backward predicted block (the target bit width) and an optimal backward motion vector.

The search is performed in the backward reference image using the integer pixel step size, to obtain the optimal backward predicted block.

212: Derive a forward motion vector from the optimal backward motion vector.

213: Obtain an optimal backward predicted block (a large bit width) and a forward predicted block (a large bit width) according to the optimal backward motion vector and the forward motion vector.

214: Obtain a predicted block (the target bit width) of the current image block according to the optimal backward predicted block and the forward predicted block, to update the initial predicted block.

215: Determine whether the optimal backward motion vector is the same as an initial search motion vector.

It should be understood that specific implementation forms of step 211 to step 215 may be the same as those of step 206 to step 210. For brevity, step 211 to step 215 are not described in detail again.

216: Determine, according to the optimal forward motion vector or a searching point of the optimal forward predicted block, a searching point using a fractional pixel step size.

217: Perform a search using the fractional pixel step size, to obtain an optimal forward predicted block (the target bit width) and an optimal forward motion vector.

Further, a search may be performed according to the searching point using the fractional pixel step size that is obtained in step 216, to obtain a forward predicted block of at least one current decoded block (a pixel value of the predicted block is a pixel value having a large bit width). A bit width shift and limiting operation is performed on a pixel value of each forward predicted block to obtain a new pixel value of each forward predicted block. A bit width of the new pixel value of the forward predicted block is the same as a target bit width of a bitstream.

Further, when the optimal forward motion vector is obtained, a difference between the new pixel value of each forward predicted block and the pixel value of the initial predicted block may be calculated, and a forward predicted block having the smallest SAD and a forward motion vector corresponding thereto are selected as an optimal forward predicted block and an optimal forward motion vector corresponding thereto.

218: Perform motion compensation according to the optimal forward motion vector obtained in step 217, to obtain an optimal forward predicted block (a large bit width).

219: Determine, according to the optimal backward motion vector or a searching point of the optimal backward predicted block, a searching point using the fractional pixel step size.

220: Perform a search using the fractional pixel step size, to obtain an optimal backward predicted block (the target bit width) and an optimal backward motion vector.

221: Perform motion compensation according to the optimal backward motion vector obtained in step 220, to obtain an optimal backward predicted block (a large bit width).

It should be understood that specific implementation forms of step 219 to step 221 are the same as those of step 216 to step 218. For brevity, details are not described herein again.

222: Determine a predicted value (the target bit width) of a pixel value of the current image block according to the optimal forward predicted block and the optimal backward predicted block obtained in step 218 and step 221.

When the predicted value of the pixel value of the current image block is determined according to the optimal forward predicted block and the optimal backward predicted block, weighted processing may be performed on a pixel value of the optimal forward predicted block and a pixel value of the optimal backward predicted block, and a pixel value obtained after the weighted processing is used as the predicted value of the pixel value of the current image block.

Further, the predicted value of the pixel value of the current image block may be obtained according to a formula (2):

$$\text{predSamples}'[x][y]=(\text{predSamples}L0'[x][y]+\text{predSamples}L1'[x][y]+1)>>1 \qquad (2)$$

where predSamplesL0' is an optimal forward predicted block, predSamplesL1' is an optimal backward predicted block, predSamples' is a final predicted block of the current image block, predSamplesL0'[x][y] is a pixel value of the optimal forward predicted block at a pixel (x, y), predSamplesL1'[x][y] is a pixel value of the optimal backward predicted block at the pixel (x, y), predSamples'[x][y] is a pixel value of the final predicted block at the pixel (x, y), and Clip3( ) is a limiting function.

In this application, when a search is performed using the fractional pixel step size, a half pixel step size, a ¼ pixel step size, a ⅛ pixel step size, or the like may be further used.

How to determine a searching point when a search is performed using a half pixel step size is described in detail below with reference to FIG. 9 to FIG. 11.

Figure 9:
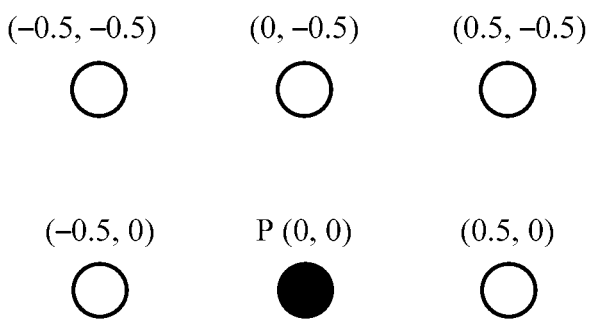
FIG. 9 is a schematic diagram of a search starting point.

As shown in FIG. 9, P(0, 0) is a searching point using an integer pixel step size, and when a searching point using a fractional pixel step size is determined, eight adjacent searching points ('0.5, −0.5), (0.5, −0.5), (−0.5, 0.5), (0.5, 0.5), (0, −0.5), (0.5, 0), (0, 0.5), and (−0.5, 0) around P(0, 0) are all determined as searching points when a search is performed using a half pixel step size.

Figure 10:
FIG. 10 is a schematic diagram of a search starting point.
Figure 10:
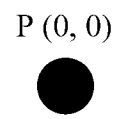
Figure 10:

As shown in FIG. 10, P(0, 0) is a searching point using an integer pixel step size, and when a searching point using a fractional pixel step size is determined, four searching points (−0.5, −0.5), (0.5, −0.5), (−0.5, 0.5), and (0.5, 0.5) around P(0, 0) are all determined as searching points when a search is performed using a half pixel step size.

Figure 11:
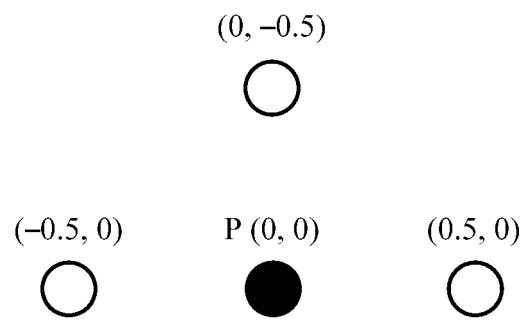
FIG. 11 is a schematic diagram of a search starting point.
Figure 11:
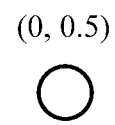

As shown in FIG. 11, P(0, 0) is a searching point using an integer pixel step size, and when a searching point using a fractional pixel step size is determined, four searching points (0, −0.5), (0.5, 0), (0, 0.5), and (−0.5, 0) around P(0, 0) are all determined as searching points when a search is performed using a half pixel step size.

Compared with a manner of determining a searching point using the half pixel step size shown in FIG. 9, in manners of determining a searching point using the half pixel step size shown in FIG. 10 and FIG. 11, a quantity of searching points using the half pixel step size can be reduced, and complexity of a search can be reduced.

Figure 12:
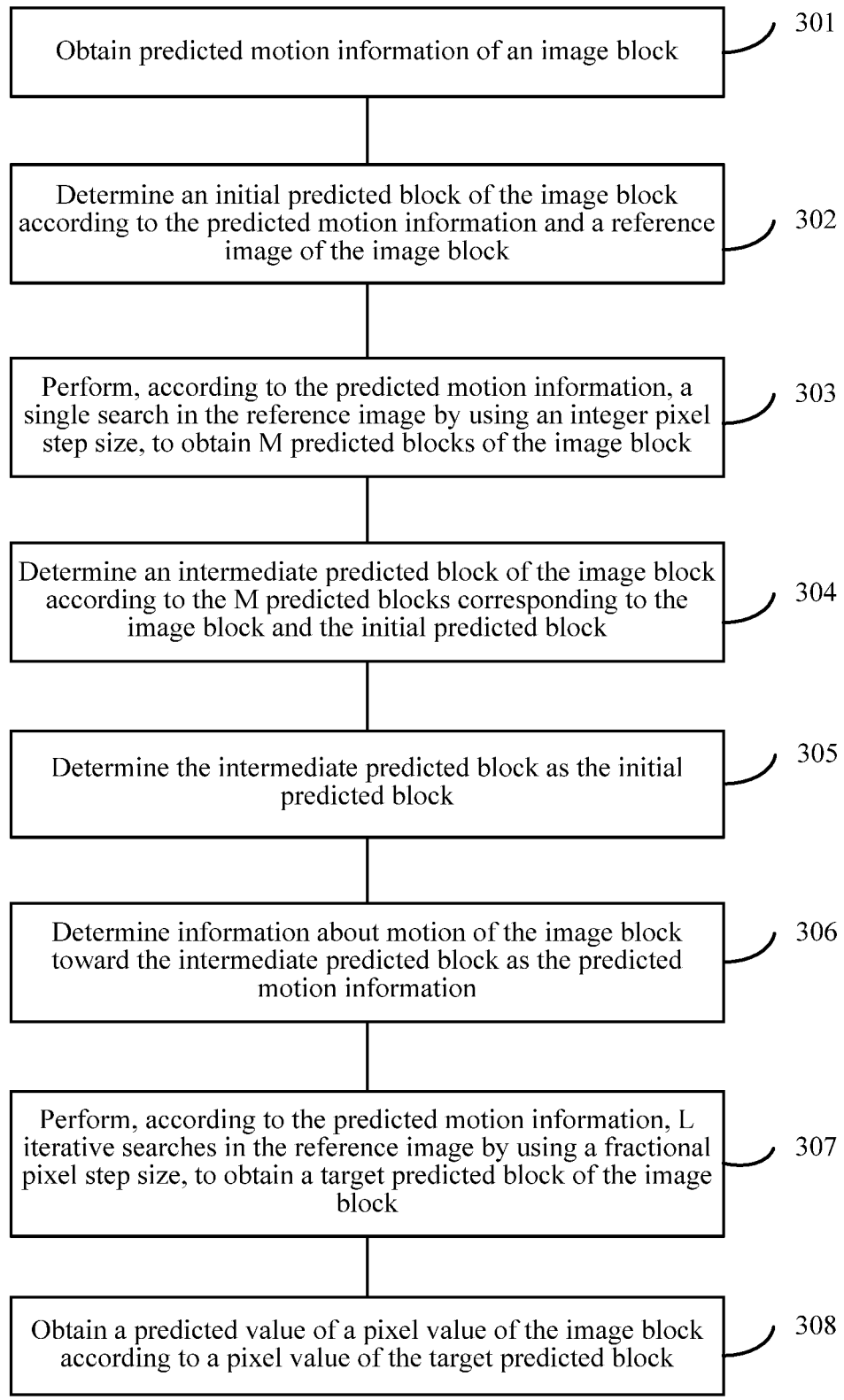
FIG. 12 is a schematic flowchart of an image prediction method according to an embodiment of this application.

FIG. 12 is a schematic flowchart of an image prediction method according to an embodiment of this application. The method shown in FIG. 12 may be performed by a video encoding and decoding apparatus, a video codec, a video encoding and decoding system, or another device having a video encoding and decoding function. The method shown in FIG. 12 includes step 301 to step 308, and step 301 to step 308 are described in detail below.

301: Obtain predicted motion information of an image block.

The predicted motion information may include indication information of a prediction direction (which usually is forward prediction, backward prediction, or bidirectional prediction), a motion vector toward a reference image block (which usually is a motion vector of an adjacent block), and information about an image in which the reference image block is located (which is usually understood as reference image information). The motion vector includes a forward motion vector and/or a backward motion vector, and the reference image information includes reference frame index information of a forward prediction reference image block and/or a backward prediction reference image block.

When the predicted motion information of the image block is obtained, the following manners may be used. For example, the predicted motion information of the image block may be obtained in manner 1 and manner 2 below step 101.

302: Determine an initial predicted block of the image block according to the predicted motion information and a reference image of the image block.

303: Perform, according to the predicted motion information, a single search in the reference image using an integer pixel step size, to obtain M predicted blocks of the image block, where M is a preset value and is an integer greater than 1.

304: Determine an intermediate predicted block of the image block according to the M predicted blocks corresponding to the image block and the initial predicted block.

305: Determine the intermediate predicted block as the initial predicted block.

306: Determine information about motion of the image block toward the intermediate predicted block as the predicted motion information.

307: Perform, according to the predicted motion information, L iterative searches in the reference image using a fractional pixel step size, to obtain a target predicted block of the image block, where L is a preset value and is an integer greater than 1.

308: Obtain a predicted value of a pixel value of the image block according to a pixel value of the target predicted block.

In this application, after the single search is performed using the integer pixel step size, based on a result of the single search performed using the integer pixel step size, multiple iterative searches are further performed using the fractional pixel step size, and a target predicted block is determined based on predicted blocks obtained by means of the multiple iterative searches using the fractional pixel step size. Compared with a manner of performing searches using the integer pixel step size and the fractional pixel step size alternately, a volume of read data can be reduced in a search process and complexity of image prediction can be reduced.

It should be understood that the method shown in FIG. 12 differs from the method shown in FIG. 3 in that, in the method shown in FIG. 12, the single search is first performed using the integer pixel step size, and then, the multiple iterative searches are performed using the fractional pixel step size, while in the method shown in FIG. 3, the multiple iterative searches are first performed using the integer pixel step size, and then, the single search is further performed using the fractional pixel step size. Explanations and definitions of same steps or same terms in the method shown in FIG. 3 are also applicable to the method shown in FIG. 12. For brevity, repeated descriptions are appropriately omitted herein.

A process of the image prediction method in this embodiment of this application is described in detail below with reference to FIG. 13. Similar to the method shown in FIG. 3, the method shown in FIG. 13 may also be performed by a video encoding and decoding apparatus, a video codec, a video encoding and decoding system, or another device having a video encoding and decoding function. The method shown in FIG. 13 may be performed in an encoding process or a decoding process. Further, the method shown in FIG. 13 may be performed in an encoding process or in an inter prediction process during decoding.

The method shown in FIG. 13 further includes step 401 to step 409, and step 401 to step 409 are separately described in detail below.

401: Obtain predicted motion information of a current image block.

When the predicted motion information is obtained, further, the predicted motion information of the current image block may be determined according to motion information of an adjacent image block of the current image block. Further, the predicted motion information may alternatively be obtained in manner 1 and manner 2 below step 101.

When a reference image of the current image block includes a forward reference image and a backward reference image, the predicted motion information includes indication information of a prediction direction (which usually is forward prediction, backward prediction, or bidirectional prediction), a motion vector toward a reference image block (which usually is a motion vector of an adjacent block), and information about an image in which the reference image block is located (which is usually understood as reference image information). The motion vector includes a forward motion vector and/or a backward motion vector, and the reference image information includes reference frame index information of a forward prediction reference image block and/or a backward prediction reference image block.

402: Obtain a forward predicted block of the current image block in a forward reference image, where a pixel value of the forward predicted block is a pixel value having a large bit width.

403: Obtain a backward predicted block of the current image block in a backward reference image, where a pixel value of the backward predicted block is a pixel value having a large bit width.

It should be understood that in this specification, a pixel value having a large bit width indicates a pixel value whose bit width is larger than a final target bit width of image prediction. For example, if the bit widths of the pixel values of the forward predicted block and the backward predicted block in step 402 and step 403 are both 14 bits, and the target bit width is 10 bits, because the bit widths of the pixel values of the forward predicted block and the backward predicted block are larger than the target bit width, the pixel values of the forward predicted block and the backward predicted block may be referred to as pixel values having large bit widths.

It should be understood that the predicted motion information in step 401 may further include a forward motion vector and a backward motion vector. In this way, in step 402 and step 403, the forward predicted block of the current image block may be obtained in the forward reference image using a motion compensation method according to the forward motion vector, and the backward predicted block of the current image block may be obtained in the backward reference image using a motion compensation method according to the backward motion vector.

It should be understood that after the forward predicted block and the backward predicted block are obtained in step 402 and step 403, no bit width shift and limiting operation is performed on the pixel values of the forward predicted block and the backward predicted block such that the pixel values of the forward predicted block and the backward predicted block are maintained at large bit widths.

404: Obtain an initial predicted block according to the forward predicted block and the backward predicted block.

It should be understood that the forward predicted block and the backward predicted block in step 404 are respectively obtained in step 402 and step 403, and the pixel value of the forward predicted block and the pixel value of the backward predicted block are pixel values having large bit widths.

When the initial predicted block is obtained according to the forward predicted block and the backward predicted block, weighted processing may be further performed on the pixel value of the forward predicted block and the pixel value of the backward predicted block, and an obtained pixel value is determined as the pixel value of the initial predicted block (which may also be referred to as a matching predicted block). It should be understood that after the weighted processing is performed on the pixel value of the forward predicted block and the pixel value of the backward predicted block, no bit width shift and limiting operation is performed on the pixel value obtained after the weighted processing such that the pixel value of the obtained initial predicted block also has a large bit width.

When the weighted processing is performed on the pixel value of the forward predicted block and the pixel value of the backward predicted block, a pixel value of each pixel in the initial predicted block may be obtained according to a formula (3):

$$predSamples[x][y]=(predSamplesL0[x][y]+predSamplesL1[x][y]+1)>>1 \quad (3)$$

In the formula (3), predSamplesL0 is a forward predicted block, predSamplesL1 is a backward predicted block, predSamples is an initial predicted block, predSamplesL0[x][y] is a pixel value of a pixel (x, y) in the forward predicted block, predSamplesL1[x][y] is a pixel value of a pixel (x, y) in the backward predicted block, and predSamples[x][y] is a pixel value of a pixel (x, y) in the initial predicted block.

When the bit widths of the pixel value of the forward predicted block and the pixel value of the backward predicted block are both 14 bits, the bit width of the pixel value of the initial predicted block that is obtained according to the formula (3) is also 14 bits. For example, the pixel value of the pixel in the initial predicted block is calculated according to the formula (3) such that the bit width of the pixel value of the pixel in the initial predicted block and the bit widths (both large bit widths) of the forward predicted block and the backward predicted block can maintain consistent.

405: Search the forward reference image for at least one forward predicted block, where a pixel value of each of the at least one forward predicted block is a pixel value having a large bit width.

406: Determine an optimal forward predicted block in the at least one forward predicted block, where a pixel value of the optimal forward predicted block is a pixel value having a large bit width.

Further, when the optimal forward predicted block is determined in the at least one forward predicted block, a difference between the pixel value of each of the at least one forward predicted block and the pixel value of the initial predicted block may be determined first, and then, a forward predicted block, in the at least one forward predicted block, having a pixel value whose difference from the pixel value of the initial predicted block is the smallest is determined as the optimal forward predicted block.

407: Search the backward reference image for at least one backward predicted block, where a pixel value of each of the at least one backward predicted block is a pixel value having a large bit width.

In step 405, when a search is performed in the forward reference image, the search (or referred as a motion search) may be performed using an integer pixel step size, to obtain the at least one forward predicted block.

In step 407, when a search is performed in the backward reference image, the search (or referred as a motion search) may be performed using an integer pixel step size, to obtain the at least one backward predicted block.

When a search is performed using the integer pixel step size, a search starting point may be an integer pixel or may be a fractional pixel, for example, an integer pixel, a ½ pixel, a ¼ pixel, a ⅛ pixel, or a 1/16 pixel.

In addition, when the at least one forward predicted block and the at least one backward predicted block are searched for in step 405 and step 407, the searches may be directly performed using a fractional pixel step size, or searches may be performed using both the integer pixel step size and a fractional pixel step size.

It should be understood that when a search is performed using the fractional pixel step size, a search starting point may be an integer pixel or a fractional pixel.

408: Determine an optimal backward predicted block in the at least one backward predicted block, where a pixel value of the optimal backward predicted block is a pixel value having a large bit width.

Similar to determining the optimal forward predicted block, when the optimal backward predicted block is determined, a difference between the pixel value of each of the at least one backward predicted block and the pixel value of the initial predicted block may be determined first, and then, a backward predicted block, in the at least one backward predicted block, having a pixel value whose difference from the pixel value of the initial predicted block is the smallest is determined as the optimal backward predicted block.

When the difference between the pixel value of the forward predicted block and the pixel value of the initial predicted block is determined through comparison, and the difference between the pixel value of the backward predicted block and the pixel value of the initial predicted block is determined through comparison, a difference between pixel values of different predicted blocks may be measured using an SAD, an SATD, or a sum of absolute square differences.

409: Determine a predicted value of a pixel value of the current image block according to the optimal forward predicted block and the optimal backward predicted block.

When the predicted value of the pixel value of the current image block is determined, weighted processing may be performed on a pixel value of the optimal forward predicted block and a pixel value of the optimal backward predicted block. Because the pixel values of the optimal forward predicted block and the optimal backward predicted block are both pixel values having large bit widths, after the weighted processing is performed, an obtained pixel value still has a large bit width. In this case, a bit width shift and limiting operation needs to be performed on the pixel value obtained after the weighted processing, and then, the pixel value obtained after the bit width shift and limiting operation is performed is determined as the predicted value of the pixel value of the current image block.

Further, the predicted value of the pixel value of the current image block may be obtained according to a formula (4):

$$predSamples'[x][y]=Clip3(0,(1<<bitDepth)-1,(A+offset2)>>shift2) \quad (4)$$

where $A=predSamplesL0'[x][y]+predSamplesL1'[x][y]$, predSamplesL0' is an optimal forward predicted block, predSamplesL1' is an optimal backward predicted block, predSamples' is a current image block, predSamplesL0'[x][y] is a pixel value of a pixel (x, y) in the optimal forward predicted block, predSamplesL1'[x][y] is a pixel value of a pixel (x, y) in the optimal backward predicted block, predSamples'[x][y] is a predicted value of a pixel value of a pixel (x, y) in the current image block, shift2 indicates a bit width difference, and offset2 is equal to 1<<(shift2−1), and is used to perform rounding off in a calculation process.

For example, if the bit width of the pixel value of the optimal forward predicted block is 14 bits, the bit width of the pixel value of the optimal backward predicted block is also 14 bits, and bitDepth is the target bit width, shift2 is 15-bitDepth, and the bit width of the pixel value of the predicted block obtained according to the formula (4) is 14+1−shift2=bitDepth.

In addition, in this application, the predicted value of the pixel value of the current image block may alternatively be obtained according to another method. This is not limited in this application.

A process of the image prediction method in this embodiment of this application is described in detail below with reference to FIG. 14. The method shown in FIG. 14 may also be performed by a video encoding and decoding apparatus, a video codec, a video encoding and decoding system, or another device having a video encoding and decoding function. The method shown in FIG. 14 may be performed in an encoding process or a decoding process. Further, the method shown in FIG. 14 may be performed in an encoding process or in an inter prediction process during decoding.

The method shown in FIG. 14 further includes step 501 to step 509, and step 501 to step 509 are separately described in detail below.

501: Obtain predicted motion information of a current image block.

The predicted motion information of the current image block may be determined according to motion information of an adjacent image block of the current image block. Further, the predicted motion information may be obtained in manner 1 and manner 2 below step 101.

The predicted motion information includes indication information of a prediction direction (which usually is forward prediction, backward prediction, or bidirectional prediction), a motion vector toward a reference image block (which usually is a motion vector of an adjacent block), and information about an image in which the reference image block is located (which is usually understood as reference image information). The motion vector includes a forward motion vector and/or a backward motion vector, and the reference image information includes reference frame index information of a forward prediction reference image block and/or a backward prediction reference image block.

502: Obtain a forward predicted block of the current image block in a forward reference image, where a bit width of a pixel value of the forward predicted block is a target bit width.

In step 502, a motion search may be performed in the forward reference image according to a forward motion vector in the predicted motion information, to obtain the forward predicted block of the current image block.

503: Obtain a backward predicted block of the current image block in a backward reference image, where a bit width of a pixel value of the backward predicted block is the target bit width.

In step 503, a motion search may be performed in the backward reference image according to a backward motion vector in the predicted motion information, to obtain the backward predicted block of the current image block.

The target bit width in step 502 and step 503 may be a bit width of a reconstructed pixel value of a finally obtained image block. For example, the bit widths of the pixel values of the forward predicted block and the backward predicted block obtained herein are the same as a bit width of the reconstructed pixel value of the finally obtained image block.

It should be understood that in step 502 and step 503, the bit widths of the pixel values of the forward predicted block and the backward predicted block that are directly found according to the motion vectors may be larger than the target bit width, and subsequently, a shift operation is performed on the forward predicted block and the backward predicted block that are found such that the bit widths of the pixel values of the forward predicted block and the backward predicted block are reduced to the target bit width.

For example, if the bit widths of the pixel values of the forward predicted block and the backward predicted block that are found according to the motion vectors are 14 bits, and the target bit width is 10 bits, the bit widths of the pixel values of the forward predicted block and the backward predicted block that are initially found may be shifted from 14 bits to 10 bits.

504: Obtain an initial predicted block according to the forward predicted block and the backward predicted block, where the initial predicted block is the target bit width.

It should be understood that the forward predicted block and the backward predicted block in step 504 are respectively obtained in step 502 and step 503.

When the initial predicted block is obtained according to the forward predicted block and the backward predicted block, weighted processing may be performed on the pixel value of the forward predicted block and the pixel value of the backward predicted block, and then, a bit width shift and limiting operation is performed on a pixel obtained by means of the weighted processing such that a bit width of the pixel value obtained after the bit width shift and limiting operation is the target bit width.

When a pixel value of the initial predicted block is determined, a pixel value of each pixel in the initial predicted block may be obtained according to a formula (5):

$$\text{predSamples}[x][y]=\text{Clip3}(0,(1<<\text{bitDepth})-1,(B+\text{offset2})>>\text{shift2}) \quad (5)$$

where $B=\text{predSamplesL0}[x][y]+\text{predSamplesL1}[x][y]$, predSamplesL0 is a forward predicted block, predSamplesL1 is a backward predicted block, predSamples is an initial predicted block, predSamplesL0[x][y] is a pixel value of a pixel (x, y) in the forward predicted block, predSamplesL1[x][y] is a pixel value of a pixel (x, y) in the backward predicted block, predSamples[x][y] is a pixel value of a pixel (x, y) in the initial predicted block, shift2 indicates a bit width difference, and offset2 is equal to 1<<(shift2−1), and is used to perform rounding off in a calculation process.

To ensure that a final predicted pixel value falls within a bit width range for image prediction, a Clip3 function is defined as shown in a formula (6):

$$\text{Clip3}(x, y, z) = \begin{cases} x & ; \ z < x \\ y & ; \ z > y \\ z & ; \ \text{otherwise} \end{cases} \quad (6)$$

For example, when the bit widths of the pixel values of the forward predicted block and the backward predicted block are both 14 bits, shift2 may be set to 15-bitDepth, where bitDepth is the target bit width. In this way, a bit width of the pixel value of the initial predicted block that can be finally obtained according to the formula (5) is 14+1-shift2=bitDepth. For example, the bit width of the pixel value of the finally obtained initial predicted block is the same as the target bit width.

505: Search the forward reference image for at least one forward predicted block, where a bit width of a pixel value of the at least one forward predicted block is the target bit width.

506: Determine an optimal forward predicted block in the at least one forward predicted block, where a bit width of the optimal forward predicted block is the target bit width.

When the optimal forward predicted block is determined in the at least one forward predicted block, a difference between a pixel value of each of the at least one forward predicted block and the pixel value of the initial predicted block may be determined, and a forward predicted block, in the at least one forward predicted block, having a pixel value whose difference from the pixel value of the initial predicted block is the smallest is determined as the optimal forward predicted block.

507: Search the backward reference image for at least one backward predicted block, where a bit width of a pixel value of the at least one backward predicted block is the target bit width.

508: Determine an optimal backward predicted block in the at least one backward predicted block, where a bit width of the optimal backward predicted block is the target bit width.

When the optimal forward predicted block is determined in the at least one backward predicted block, a difference between a pixel value of each of the at least one backward predicted block and the pixel value of the initial predicted block may be determined, and a backward predicted block, in the at least one backward predicted block, having a pixel value whose difference from the pixel value of the initial predicted block is the smallest is determined as the optimal backward predicted block.

In step 505 and step 507, when a search is performed in the forward reference image or the backward reference image, the search (or referred as a motion search) may be performed using an integer pixel step size, to obtain the at least one forward predicted block or the at least one backward predicted block. When a search is performed using the integer pixel step size, a search starting point may be an integer pixel or may be a fractional pixel, for example, an integer pixel, a ½ pixel, a ¼ pixel, a ⅛ pixel, or a 1/16 pixel.

In addition, when the at least one forward predicted block and the at least one backward predicted block are searched for in step 505 and step 507, the searches may be directly performed using a fractional pixel step size, or searches may be performed using both the integer pixel step size and a fractional pixel step size.

In step 505 and step 507, a pixel value having a large bit width may be used in a search process such that a pixel value of at least one predicted block obtained by means of the search is a pixel value having a large bit width. Subsequently, a bit width shift and limiting operation is performed on the pixel value of the at least one predicted block such that the pixel value of the at least one predicted block obtained by means of the search becomes a pixel value having the target bit width.

Further, a bit width shift and limiting operation may be performed, according to a formula (7), on the pixel value of the forward predicted block obtained by means of the search:

$$\text{predSamples}L0'[x][y]=\text{Clip3}(0,(1<<\text{bitDepth})-1, (\text{predSamples}L0[x][y]+\text{offset2})>>\text{shift2}) \quad (7)$$

where predSamplesL0 is a forward predicted block that is found, predSamplesL0' is a forward predicted block after a bit width shift and limiting operation is performed on predSamplesL0, predSamplesL0[x][y] is a pixel value of a pixel (x, y) in the forward predicted block that is found, predSamplesL0'[x][y] is a pixel value of a pixel (x, y) in the forward predicted block obtained after the bit width shift and limiting operation is performed, shift2 indicates a bit width difference, and offset2 is equal to 1<<(shift2−1), and is used to perform rounding off in a calculation process.

For a backward predicted block that is found, a bit width shift and limiting operation may also be performed, using the formula (7), on the backward predicted block that is found. In this case, predSamplesLO indicates the backward predicted block that is found, and predSamplesL0' is a backward predicted block obtained after a bit width shift and limiting operation is performed on predSamplesL0.

It should be understood that when a search is performed using the integer pixel step size in step 505 and step 507, further, any search method may be used.

In step 506 and step 508, when a difference between the pixel value of each forward predicted block and a pixel value of a matching predicted block is calculated, and a difference between the pixel value of each backward predicted block and the pixel value of the matching predicted block is calculated, the difference between the pixel value of each forward predicted block and the pixel value of the matching predicted block may be measured using an SAD, an SATD, or a sum of absolute square differences. However, this application is not limited thereto, and some other parameters used to describe similarity between two predicted blocks may also be used.

509: Determine, according to the optimal forward predicted block and the optimal backward predicted block, a predicted value of a pixel value of the current image block, where the predicted value of the pixel value of the current image block is the target bit width.

When the predicted value of the pixel value of the current image block is determined according to the optimal forward predicted block and the optimal backward predicted block, weighted processing may be performed on a pixel value of the optimal forward predicted block and a pixel value of the optimal backward predicted block that are obtained in step 507 and step 508, and a pixel value obtained after the weighted processing is used as the predicted value of the pixel value of the current image block.

Further, the predicted value of the pixel value of the current image block may be obtained according to a formula (8):

$$\text{predSamples'}[x][y] = (\text{predSamples}L0'[x][y] + \text{predSamples}L1'[x][y] + 1) >> 1 \quad (8)$$

where predSamplesL0' is an optimal forward predicted block, predSamplesL1' is an optimal backward predicted block, predSamples' is a final predicted block of the current image block, predSamplesL0'[x][y] is a pixel value of the optimal forward predicted block at a pixel (x, y), predSamplesL1'[x][y] is a pixel value of the optimal backward predicted block at the pixel (x, y), predSamples'[x][y] is a pixel value of the final predicted block at the pixel (x, y), and Clip3( ) is a limiting function.

Figure 13:
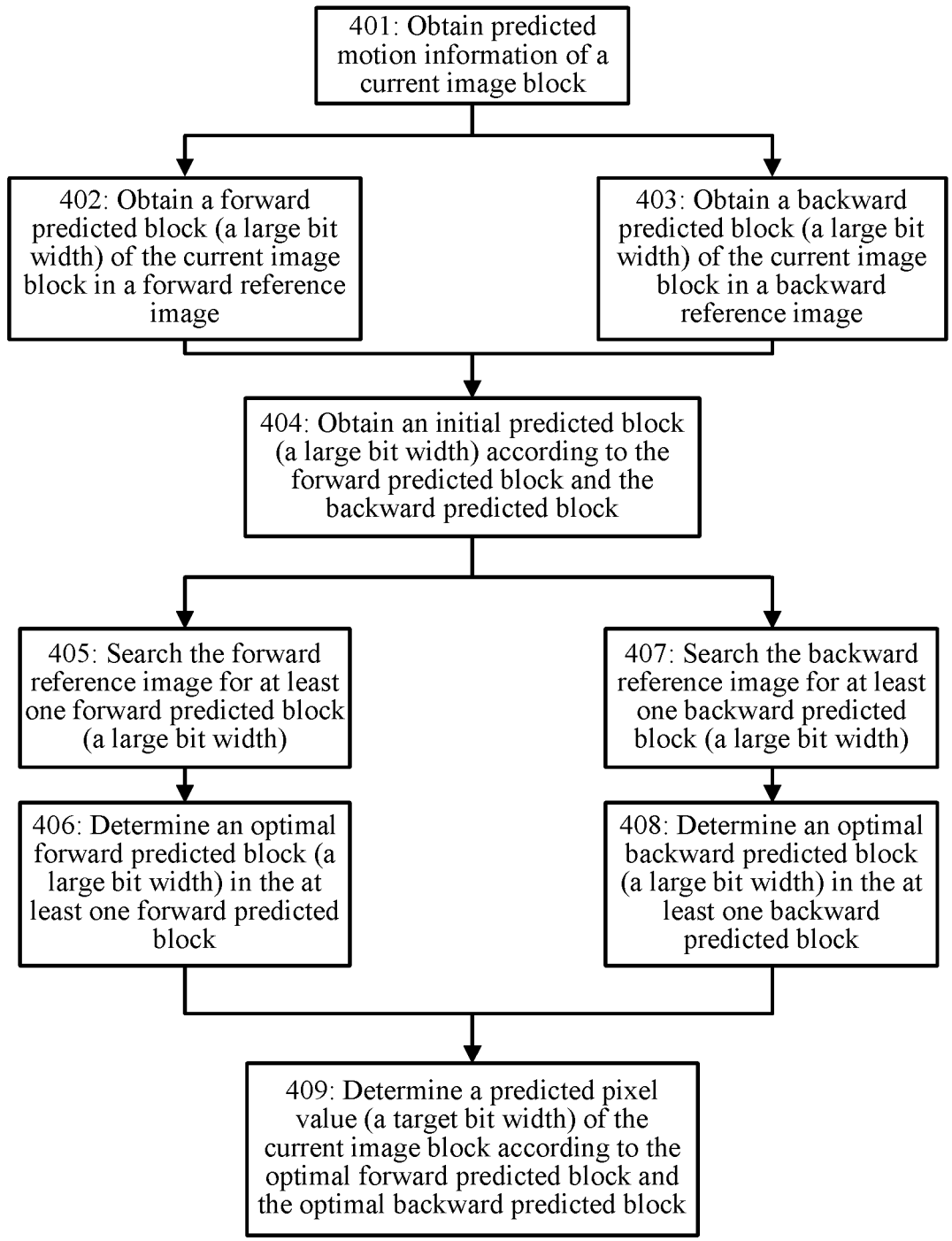
FIG. 13 is a schematic flowchart of an image prediction method according to an embodiment of this application.
Figure 14:
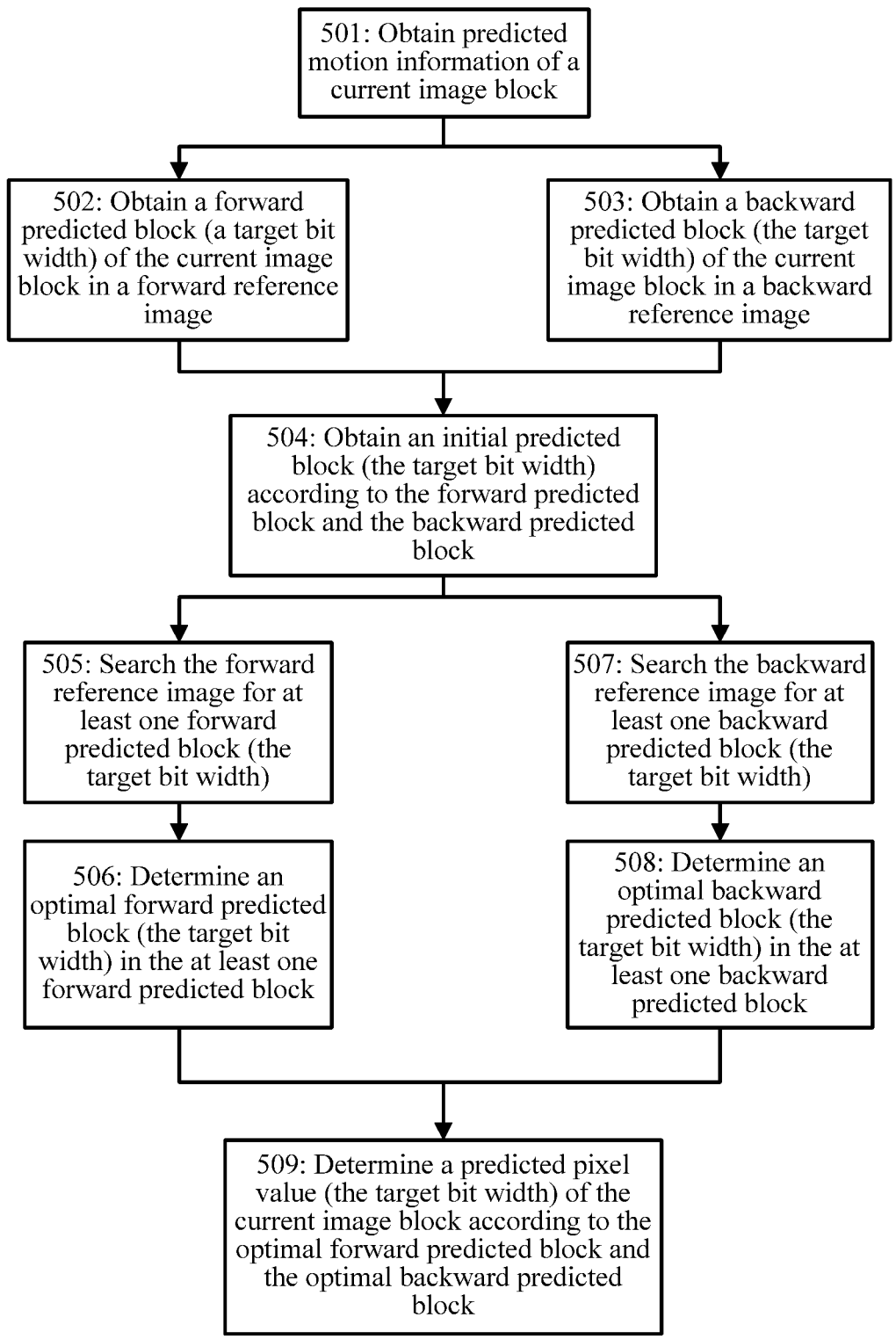
FIG. 14 is a schematic flowchart of an image prediction method according to an embodiment of this application.

It should be understood that in the method shown in FIG. 13, bit widths of pixel values of various predicted blocks are large bit widths such that accuracy of image prediction can be ensured, while in the method shown in FIG. 14, bit widths of pixel values of various predicted blocks are the target bit width such that complexity of image prediction can be reduced.

In addition, in the method shown in FIG. 14, in step 502 and step 503, after the forward predicted block and the backward predicted block are obtained in the forward reference image and the backward reference image, the pixel values of the forward predicted block and the backward predicted block may be not shifted such that the bit widths of the pixel values of the forward predicted block and the backward predicted block may be maintained at large bit widths. In this way, the initial predicted block obtained in step 504 is more accurate.

It should be understood that in this embodiment of this application, when an iterative search is performed using the integer pixel step size and a single search is performed using the fractional pixel step size, specific implementation processes may be performed with reference to the processes of the methods in FIG. 13 and FIG. 14.

It should be understood that the image prediction method in this embodiment of this application may correspond to the inter prediction shown in FIG. 1 and FIG. 2. The image prediction method in this embodiment of this application may be performed in the inter prediction process shown in FIG. 1 and FIG. 2. The image prediction method in this embodiment of this application may be further performed by an inter prediction module in an encoder or a decoder. In addition, the image prediction method in this embodiment of this application may be performed in any electronic device or apparatus that may need to encode and/or decode a video image.

An image prediction apparatus in an embodiment of this application is described in detail below with reference to FIG. 15 and FIG. 16. The image prediction apparatus shown in FIG. 15 corresponds to the methods shown in FIG. 3, FIG. 7A and FIG. 7B, FIG. 13, and FIG. 14, and can perform various steps in the methods shown in FIG. 3, FIG. 7A and FIG. 7B, FIG. 13, and FIG. 14. The image prediction apparatus shown in FIG. 16 corresponds to the methods shown in FIG. 12, FIG. 13, and FIG. 14, and can perform various steps in the methods shown in FIG. 12, FIG. 13, and FIG. 14. For brevity, repeated descriptions are appropriately omitted below.

Figure 15:
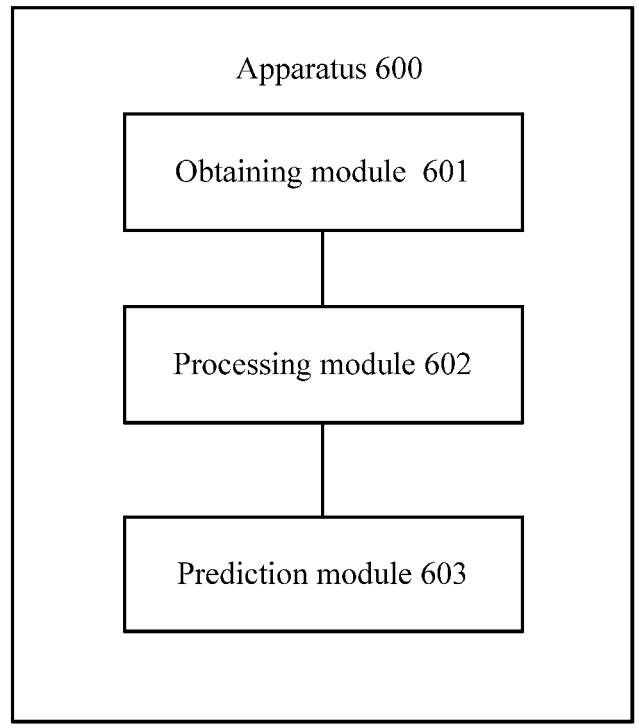
FIG. 15 is a schematic block diagram of an image prediction apparatus according to an embodiment of this application.

FIG. 15 is a schematic block diagram of an image prediction apparatus 600 according to an embodiment of this application. The apparatus 600 in FIG. 15 includes an obtaining module 601 configured to obtain predicted motion information of an image block; a processing module 602, where the processing module 602 is configured to determine an initial predicted block of the image block according to the predicted motion information and a reference image of the image block; perform, according to the predicted motion information, L iterative searches in the reference image using an integer pixel step size, to obtain an intermediate predicted block of the image block, where L is a preset value and is an integer greater than 1; perform a single search in the reference image using a fractional pixel step size, to obtain M predicted blocks of the image block, where M is a preset value and is an integer greater than 1; and determine a target predicted block of the image block according to the M predicted blocks and the intermediate predicted block; and a prediction module 603 configured to obtain a predicted value of a pixel value of the image block according to a pixel value of the target predicted block.

In this application, after multiple iterative searches are performed using the integer pixel step size, based on results of the iterative searches performed using the integer pixel step size, a search is further performed using the fractional pixel step size, and a target predicted block is determined based on predicted blocks obtained by means of the search performed using the fractional pixel step size. Compared with a manner of performing searches using the integer pixel step size and the fractional pixel step size alternately, a volume of read data can be reduced in a search process and complexity of image prediction can be reduced.

Optionally, in an embodiment, the processing module 602 is further configured to obtain, in the reference image using an interpolation filter according to the predicted motion information, a first predicted block and a second predicted block that correspond to the image block, where a gain of the interpolation filter is greater than 1; and obtain the initial predicted block according to the first predicted block and the second predicted block, where pixel values of the first predicted block, the second predicted block, and the initial predicted block all have a same bit width.

Optionally, in an embodiment, bit widths of pixel values of the intermediate predicted block and the target predicted block are both the same as a bit width of a pixel value of the initial predicted block.

Because the pixel value of the initial predicted block has a relatively large bit width, and the bit widths of the pixel values of the intermediate predicted block and the target predicted block are the same as the bit width of the pixel value of the initial predicted block, that is, for the intermediate predicted block, the initial predicted block, and the target predicted block, the pixel values are all indicated using the relatively large bit widths, accuracy of image prediction can be improved using a pixel value having a relatively large bit width in an image prediction process.

Optionally, in an embodiment, the processing module 602 is further configured to obtain, in the reference image using an interpolation filter according to the predicted motion information, a first predicted block and a second predicted block that correspond to the image block, where a gain of the interpolation filter is greater than 1; perform a shift operation on a pixel value of the first predicted block and a pixel value of the second predicted block, to reduce bit widths of the pixel values of the first predicted block and the second predicted block to a target bit width, where the target bit width is a bit width of a reconstructed pixel value of the image block; and obtain the initial predicted block according to the first predicted block and the second predicted block, where a bit width of a pixel value of the initial predicted block is the target bit width.

Optionally, in an embodiment, the bit widths of the pixel values of the intermediate predicted block and the target predicted block are both the target bit width.

Because all of the bit widths of the pixel values of the initial predicted block, the intermediate predicted block, and the target predicted block are the target bit width, in a process of performing prediction on an image, conversions of a pixel value between different bit widths can be reduced, and the predicted value of the pixel value of the image block is determined according to the target predicted block having the pixel value whose bit width is the target bit width, instead of determining the predicted value of the pixel value of the image block after performing motion compensation to obtain a predicted block whose pixel value has a large bit width such that an operation of motion compensation is omitted, a process of image prediction is simplified, and complexity of the image prediction is reduced.

Optionally, in an embodiment, the processing module 602 is further configured to repeatedly perform the following step 1 to step 3 a total of L times, to use a finally obtained initial predicted block as the intermediate predicted block. Step 1: obtaining current predicted motion information, where when step 1 is performed for the first time, the current predicted motion information is predicted motion information of the image block, and when step 1 is performed for the $i^{th}$ time, the current predicted motion information is information about motion of the image block toward a current initial predicted block, where i is an integer less than or equal to L and greater than 1; step 2: performing, according to the current predicted motion information, a search in the reference image using the integer pixel step size, to obtain N predicted blocks corresponding to the image block, where N is a preset value and is an integer greater than 1; and step 3: obtaining a new current initial predicted block according to the N predicted blocks and the current initial predicted block.

An intermediate predicted block whose pixel value is relatively close to the pixel value of the image block can be determined by performing multiple iterative searches.

Optionally, in an embodiment, the processing module 602 is further configured to determine, in the M predicted blocks, a predicted block having a pixel value whose difference from a pixel value of the intermediate predicted block is the smallest as the target predicted block.

A predicted block closer to the image block can be obtained by determining through comparison a difference between a pixel value of each of the M predicted blocks and the pixel value of the initial predicted block in order to improve an image prediction effect.

Optionally, in an embodiment, the reference image includes a first direction reference image and a second direction reference image, and the processing module 602 is further configured to perform a search in the first direction reference image using the fractional pixel step size, to obtain the M predicted blocks of the image block; determine, in the M predicted blocks corresponding to the image block, a predicted block having a pixel value whose difference from the pixel value of the intermediate predicted block is the smallest as a first target predicted block; determine a first motion vector of the image block toward the first target predicted block; determine a second motion vector according to the first motion vector and according to a preset rule; determine, in the second direction reference image according to the second motion vector, a second target predicted block corresponding to the image block, where the first direction reference image and the second direction reference image are respectively a forward reference image and a backward reference image, or the first direction reference image and the second direction reference image are respectively a backward reference image and a forward reference image; and determine the target predicted block according to the first target predicted block and the second target predicted block.

A predicted block of an image block in a reference image in another direction is derived from a predicted block that is obtained by means of a search in a reference image in a direction such that a large quantity of search operations can be omitted, and complexity during image prediction is reduced. Moreover, because both a predicted block that corresponds to the image block and that is in a forward reference image and a predicted block that corresponds to the image block and that is in a backward reference image are used when the target predicted block is determined, accuracy of image prediction can be ensured while reducing complexity of the image prediction.

Optionally, in an embodiment, the processing module 602 is further configured to, before determining the second motion vector according to the first motion vector and according to the preset rule, determine that a distance between the image block and the first direction reference image is less than or equal to a distance between the image block and the second direction reference image.

When the distance between the image block and the first direction reference image is relatively short, a search is performed in the first direction reference image such that complexity of the search can be reduced.

Optionally, in an embodiment, the obtaining module 601 is further configured to obtain a motion vector of the image block toward the target predicted block; and the processing module 602 is configured to obtain a motion vector of the image block according to the motion vector of the image block toward the target predicted block, where the motion vector of the image block is used to predict another image block.

Determining a motion vector of the image block according to the motion vector toward the target predicted block may be further directly determining a motion vector of a target motion block as the motion vector of the image block, that is, updating motion vector of the image block, so that when image prediction is performed next time, effective prediction can be performed on another image block according to the image block.

It should be understood that the apparatus 600 may perform the methods shown in FIG. 3, FIG. 7A and FIG. 7B, FIG. 13, and FIG. 14, and the apparatus 600 may be further a video encoding apparatus, a video decoding apparatus, a video encoding and decoding system, or another device having a video encoding and decoding function. The apparatus 600 not only can be configured to perform image prediction in an encoding process, but also can be configured to perform image prediction in a decoding process.

Figure 16:
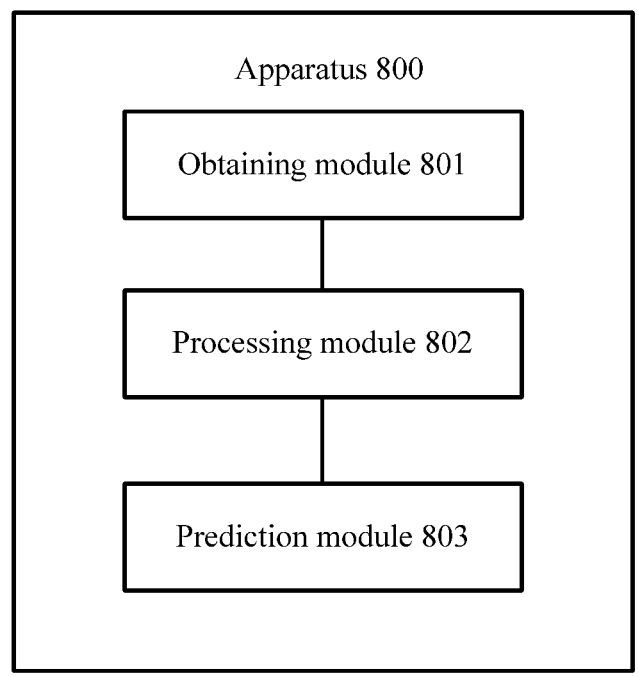
FIG. 16 is a schematic block diagram of an image prediction apparatus according to an embodiment of this application.

FIG. 16 is a schematic block diagram of an image prediction apparatus 800 according to an embodiment of this application. The apparatus 800 in FIG. 16 includes an obtaining module 801 configured to obtain predicted motion information of an image block; a processing module 802, where the processing module 802 is configured to determine an initial predicted block of the image block according to the predicted motion information and a reference image of the image block; perform, according to the predicted motion information, a single search in the reference image using an integer pixel step size, to obtain M predicted blocks of the image block, where M is a preset value and is an integer greater than 1; determine an intermediate predicted block of the image block according to the M predicted blocks and the initial predicted block; determine the intermediate predicted block as the initial predicted block; determine information about motion of the image block toward the intermediate predicted block as the predicted motion information; and perform, according to the predicted motion information, L iterative searches in the reference image using a fractional pixel step size, to obtain a target predicted block of the image block, where L is a preset value and is an integer greater than 1; and a prediction module 803 configured to obtain a predicted value of a pixel value of the image block according to a pixel value of the target predicted block.

In this application, after the single search is performed using the integer pixel step size, based on a result of the single search performed using the integer pixel step size, multiple iterative searches are further performed using the fractional pixel step size, and a target predicted block is determined based on predicted blocks obtained by means of the multiple iterative searches using the fractional pixel step size. Compared with a manner of performing searches using the integer pixel step size and the fractional pixel step size alternately, a volume of read data can be reduced in a search process and complexity of image prediction can be reduced.

It should be understood that the apparatus 800 may perform the methods shown in FIG. 12, FIG. 13, and FIG. 14, and the apparatus 800 may be further a video encoding apparatus, a video decoding apparatus, a video encoding and decoding system, or another device having a video encoding and decoding function. The apparatus 800 not only can be configured to perform image prediction in an encoding process, but also can be configured to perform image prediction in a decoding process.

This application further provides a terminal device. The terminal device includes a memory configured to store a program; and a processor configured to execute the program stored in the memory, where when the program is executed, the processor is configured to perform the image prediction method in the embodiments of this application.

The terminal device herein may be a video display device, a smartphone, a portable computer, or another device that can process or play a video.

This application further provides a video encoder, including a non-volatile storage medium and a central processing unit, where the non-volatile storage medium stores an executable program, and the central processing unit is connected to the non-volatile storage medium and executes the executable program to perform the image prediction method in the embodiments of this application.

This application further provides a video decoder, including a non-volatile storage medium and a central processing unit, where the non-volatile storage medium stores an executable program, and the central processing unit is connected to the non-volatile storage medium and executes the executable program to perform the image prediction method in the embodiments of this application.

This application further provides a video encoding system, including a non-volatile storage medium and a central processing unit, where the non-volatile storage medium stores an executable program, and the central processing unit is connected to the non-volatile storage medium and executes the executable program to perform the image prediction method in the embodiments of this application.

This application further provides a computer readable medium, where the computer readable medium stores program code to be executed by a device, and the program code includes an instruction used to perform the image prediction method in the embodiments of this application.

This application further provides a decoder, including the image prediction apparatus (for example, the apparatus 600 or the apparatus 800) in the embodiments of this application and a reconstruction module, where the reconstruction module is configured to obtain a reconstructed pixel value of the image block according to the predicted value of the image block obtained by the image prediction apparatus.

This application further provides an encoder, including the image prediction apparatus (for example, the apparatus 600 or the apparatus 800) in the embodiments of this application and a reconstruction module, where the reconstruction module is configured to obtain a reconstructed pixel value of the image block according to the predicted value of the image block obtained by the image prediction apparatus.

Structures of a video encoder and a video decoder that can perform the image prediction method in the embodiments of this application are briefly described below with reference to FIG. 17 and FIG. 18.

Figure 17:
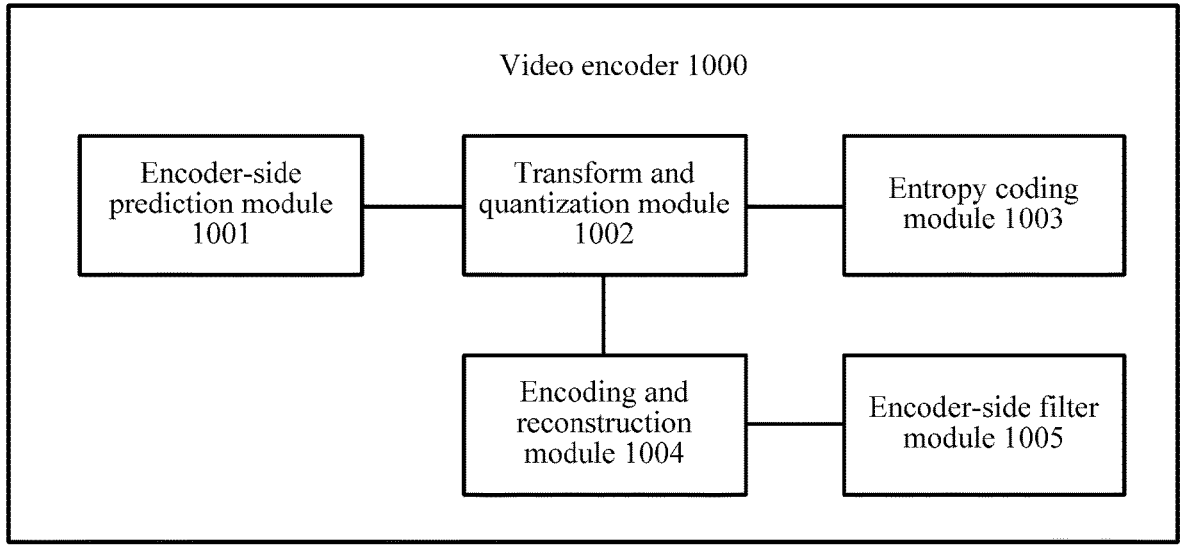
FIG. 17 is a schematic block diagram of a video encoder according to an embodiment of this application.

FIG. 17 is a schematic block diagram of a video encoder 1000 according to an embodiment of this application. The video encoder 1000 shown in FIG. 17 includes an encoder-side prediction module 1001, a transform and quantization module 1002, an entropy coding module 1003, an encoding and reconstruction module 1004, and an encoder-side filter module 1005.

The video encoder 1000 shown in FIG. 17 may encode a video, and the video encoder 1000 can implement the video encoding process shown in FIG. 1 in order to encode the video.

The video encoder 1000 may further perform the image prediction method in the embodiments of this application. Further, the video encoder 1000 may perform various steps of the image prediction methods shown in FIG. 3, FIG. 7A and FIG. 7B, FIG. 12, FIG. 13, and FIG. 14.

The image prediction apparatus in this embodiment of this application may be the encoder-side prediction module 1001 in the video encoder 1000. Further, the apparatus 600 and the apparatus 800 are equivalent to the encoder-side prediction module 1001 in the video encoder 1000.

Figure 18:
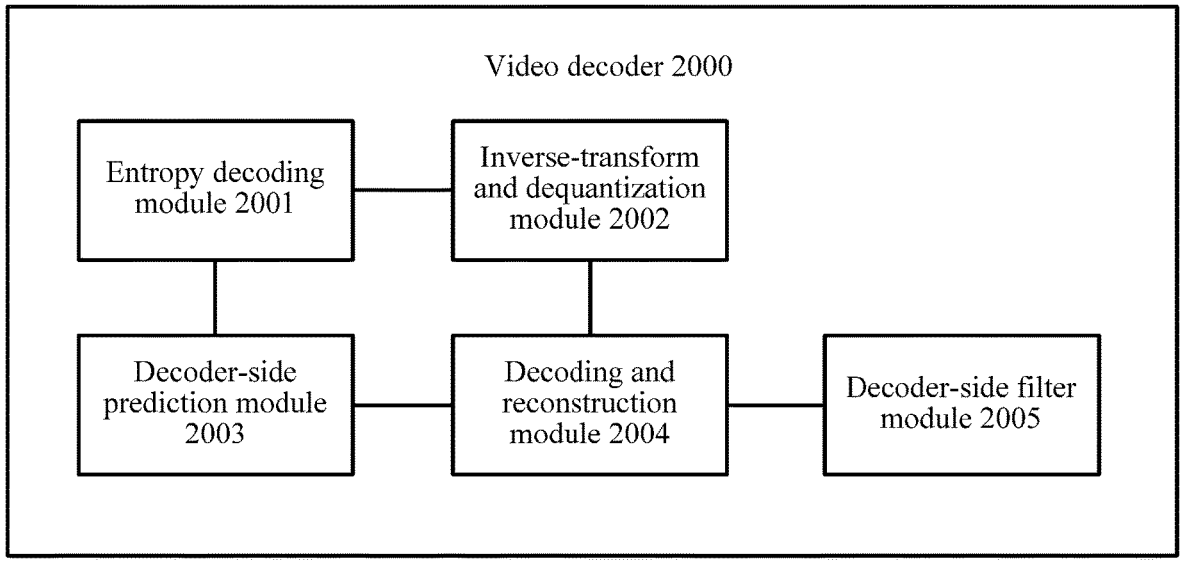
FIG. 18 is a schematic block diagram of a video decoder according to an embodiment of this application.

FIG. 18 is a schematic block diagram of a video decoder 2000 according to an embodiment of this application. The video decoder 2000 shown in FIG. 18 includes an entropy decoding module 2001, an inverse-transform and dequantization module 2002, a decoder-side prediction module 2003, a decoding and reconstruction module 2004, and a decoder-side filter module 2005.

The video decoder 2000 shown in FIG. 18 may decode a video, and the video decoder 2000 can implement the video decoding process shown in FIG. 2 in order to decode the video.

In addition, the video decoder 2000 may further perform the image prediction method in the embodiments of this application. Further, the video decoder 2000 may perform various steps of the image prediction methods shown in FIG. 3, FIG. 7A and FIG. 7B, FIG. 12, FIG. 13, and FIG. 14.

The image prediction apparatus in this embodiment of this application may be the decoder-side prediction module 2003 in the video decoder 2000. Further, the apparatus 600 and the apparatus 800 are equivalent to the decoder-side prediction module 2003 in the video decoder 2000.

An application scenario of the image prediction method in the embodiments of this application is described below with reference to FIG. 19 to FIG. 21. The image prediction method in this embodiment of this application may be performed by a video transmission system, an encoding and decoding apparatus, and an encoding and decoding system shown in FIG. 19 to FIG. 21.

Figure 19:
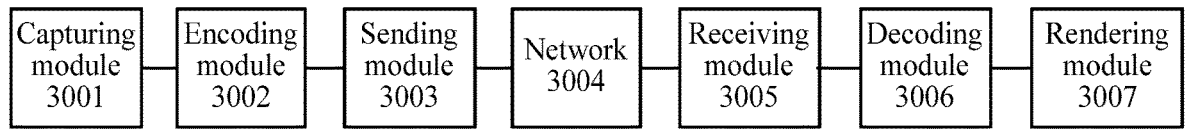
FIG. 19 is a schematic block diagram of a video transmission system according to an embodiment of this application.

FIG. 19 is a schematic block diagram of a video transmission system according to an embodiment of this application.

As shown FIG. 19, the video transmission system includes a capturing module 3001, an encoding module 3002, a sending module 3003, a network 3004, a receiving module 3005, a decoding module 3006, a rendering module 3007, and a display module 208.

The modules in the video transmission system have the following specific functions.

The capturing module 3001 includes a camera or a camera group and is configured to capture a video image and perform processing on the captured video image before encoding, to convert an optical signal into a digital video sequence.

The encoding module 3002 is configured to encode the video sequence to obtain a bitstream.

The sending module 3003 is configured to send the encoded bitstream.

The receiving module 3005 is configured to receive the bitstream sent by the sending module 3003.

The network 3004 is configured to transmit, to the receiving module 3005, the bitstream sent by the sending module 3003.

The decoding module 3006 is configured to decode the bitstream received by the receiving module 3005 to reconstruct the video sequence.

The rendering module 3007 is configured to render the reconstructed video sequence obtained by means of decoding by the decoding module 3006, to improve a display effect of the video.

The video transmission system shown in FIG. 19 can perform the image prediction method in the embodiments of this application. Further, the encoding module 3001 and the decoding module 3006 in the video transmission system shown in FIG. 19 can both perform the image prediction method in the embodiments of this application.

In addition, the capturing module 3001, the encoding module 3002, and the sending module 3003 in the video transmission system shown in FIG. 19 are equivalent to the video encoder 1000 shown in FIG. 17. The receiving module 3005, the decoding module 3006, and the rendering module 3007 in the video transmission system shown in FIG. 19 are equivalent to the video decoder 2000 shown in FIG. 18.

The encoding and decoding apparatus and the encoding and decoding system including the encoding and decoding apparatus are described in detail below with reference to FIG. 20 and FIG. 21. It should be understood that the encoding and decoding apparatus and the encoding and decoding system shown in FIG. 20 and FIG. 21 can perform the image prediction method in the embodiments of this application.

Figure 20:
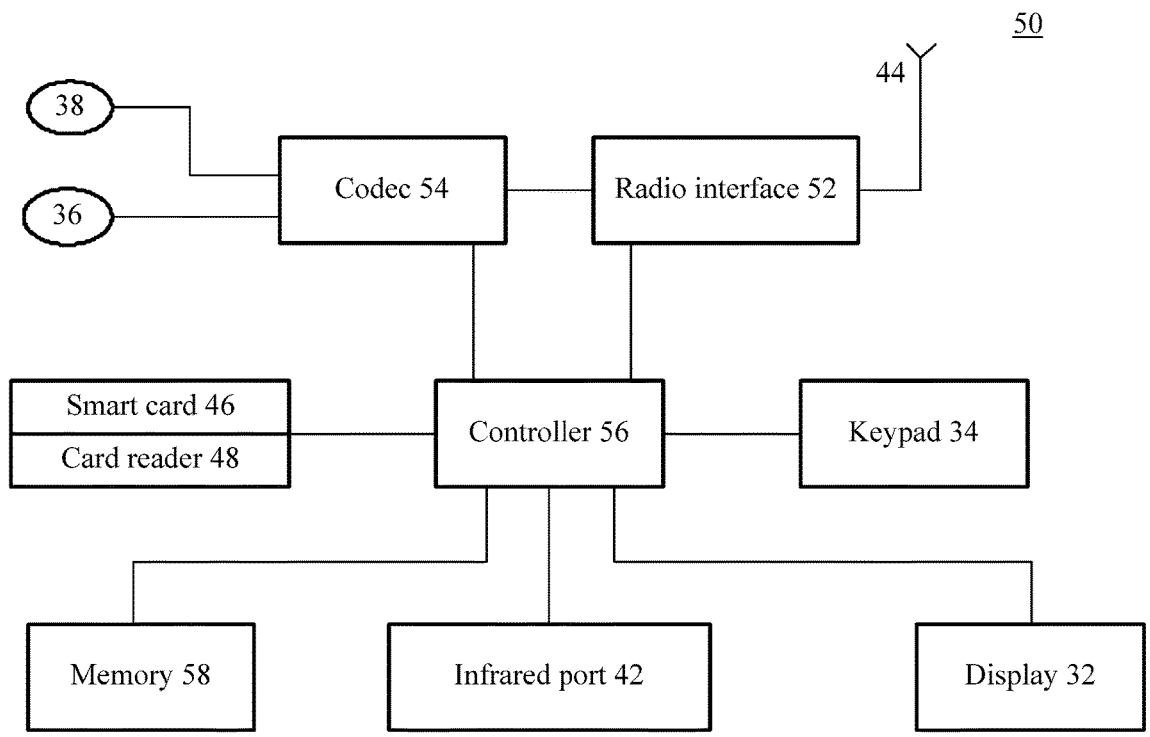
FIG. 20 is a schematic block diagram of a video encoding and decoding apparatus according to an embodiment of this application.

FIG. 20 is a schematic diagram of a video encoding and decoding apparatus according to an embodiment of this application. The video encoding and decoding apparatus 50 may be an apparatus dedicated for encoding and/or decoding a video image, or an electronic device having a video encoding and decoding function. Further, the video encoding and decoding apparatus 50 may be a mobile terminal or user equipment of a wireless communications system.

The encoding and decoding apparatus 50 may include the following modules or units including a controller 56, a codec 54, a radio interface 52, an antenna 44, a smart card 46, a card reader 48, a keypad 34, a memory 58, an infrared port 42, and a display 32. In addition to the modules and the units shown in FIG. 20, the encoding and decoding apparatus 50 may further include a microphone and any appropriate audio input module. The audio input module may input a digital signal or an analog signal. The encoding and decoding apparatus 50 may further include an audio output module. The audio output module may be an earphone, a speaker, or an analog audio output connection or a digital audio output connection. The encoding and decoding apparatus 50 may further include a battery. The battery may be a solar cell, a fuel cell, or the like. The encoding and decoding apparatus 50 may further include an infrared port configured to perform video communication with another device. The encoding and decoding apparatus 50 may also perform communication with another device in any appropriate near-field communication manner such as a Bluetooth wireless connection or a USB/firewire wired connection.

The memory 58 may store data in a form of image and data in a form of audio, and may also store an instruction to be executed on the controller 56.

The codec 54 may encode and decode audio and/or video data or implement, under the control of the controller 56, assisted encoding and assisted decoding on audio and/or video data.

The smart card 46 and the card reader 48 may provide user information and may also provide authentication information of network authentication and an authorized user. Specific implementation forms of the smart card 46 and the card reader 48 may be an integrated circuit card (Universal Integrated Circuit Card (UICC)) and a UICC reader.

The radio interface 52 may generate a radio communication signal, and the radio communication signal may be a communication signal that is generated when communication is performed in a cellular communications network, a wireless communications system, or a wireless local area network.

The antenna 44 is configured to send, to another apparatus (there are may be one or more apparatuses), a radio frequency signal that is generated on the radio interface circuit 52, and may be further configured to receive a radio frequency signal from another apparatus (there are may be one or more apparatuses).

In some embodiments of this application, the encoding and decoding apparatus 50 may receive to-be-processed video image data from another device before transmission and/or storage. In some other embodiments of this application, the encoding and decoding apparatus 50 may receive an image through a wireless or wired connection and encode/decode the received image.

Figure 21:
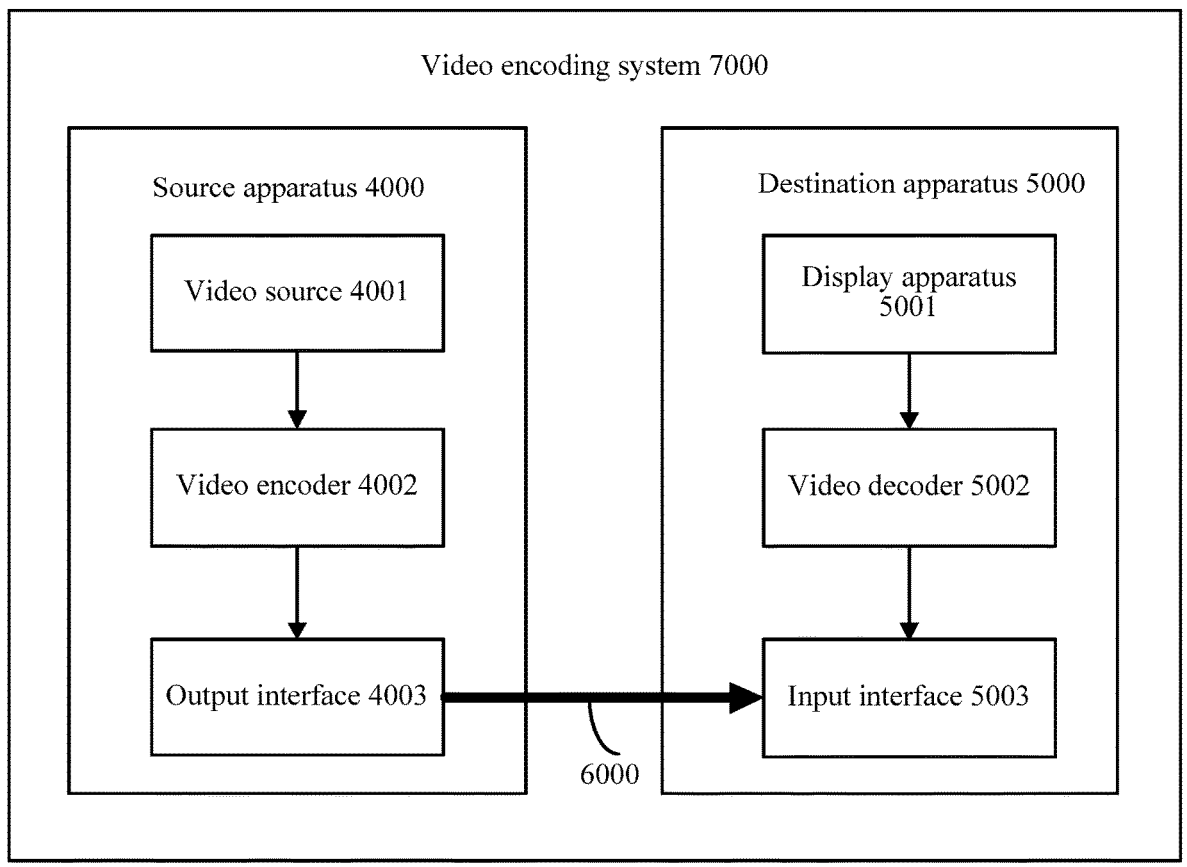
FIG. 21 is a schematic block diagram of a video encoding and decoding system according to an embodiment of this application.

FIG. 21 is a schematic block diagram of a video encoding and decoding system 7000 according to an embodiment of this application.

As shown in FIG. 21, the video encoding and decoding system 7000 includes a source apparatus 4000 and a destination apparatus 5000. The source apparatus 4000 generates encoded video data. The source apparatus 4000 may also be referred to as a video encoding apparatus or a video encoding device. The destination apparatus 5000 may decode the encoded video data generated by the source apparatus 4000. The destination apparatus 5000 may also be referred to as a video decoding apparatus or a video decoding device.

Specific implementation forms of the source apparatus 4000 and the destination apparatus 5000 may be any one of the following devices such as a desktop computer, a mobile computing apparatus, a notebook (for example, a 31aptop) computer, a tablet computer, a set-top box, a smartphone, a handset, a television, a camera, a display apparatus, a digital media player, a video game console, an in-vehicle computer, or other similar devices.

The destination apparatus 5000 may receive the encoded video data from the source apparatus 4000 using a channel 6000. The channel 6000 may include one or more media and/or apparatuses that can move the encoded video data from the source apparatus 4000 to the destination apparatus 5000. In an example, the channel 6000 may include one or more communications media that can enable the source apparatus 4000 to directly transmit the encoded video data to the destination apparatus 5000 in real time. In this example, the source apparatus 4000 may modulate the encoded video data according to a communications standard (for example, a wireless communication protocol) and may transmit the modulated video data to the destination apparatus 5000. The one or more communications media may include wireless and/or wired communications media, for example, a radio frequency (RF) spectrum or one or more physical transmission lines. The one or more communications media may form a part of a packet-based network (for example, a local area network, a wide area network, or a global network (for example, the Internet)). The one or more communications media may include a router, a switch, a base station, or another device implementing communication between the source apparatus 4000 and the destination apparatus 5000.

In another example, the channel 6000 may include a storage medium storing the encoded video data generated by the source apparatus 4000. In the example, the destination apparatus 5000 may access the storage medium by means of disk access or card access. The storage medium may include multiple types of local access-type data storage media such as BLU-RAY DISC, a high-density digital video disc (DVD), a read-only disc (Compact Disc Read-Only Memory (CD-ROM), or a flash memory, or another suitable digital storage medium configured to store the encoded video data.

In another example, the channel 6000 may include a file server or another intermediate storage apparatus storing the encoded video data generated by the source apparatus 4000. In the example, the destination apparatus 5000 may access, by means of streaming transmission or downloading, the encoded video data stored in the file server or another intermediate storage apparatus. The file server may be of a server type that can store the encoded video data and transmit the encoded video data to the destination apparatus 5000. For example, the file server may include a world wide web (Web) server (for example, used for a website), a File Transfer Protocol (FTP) server, a network attached storage (NAS) apparatus, and a local disk drive.

The destination apparatus 5000 may access the encoded video data by means of a standard data connection (for example, an Internet connection). An example type of the data connection includes a radio channel that is suitable for accessing the encoded video data stored in the file server, a wired connection (for example, a cable modem), or a combination of the radio channel and the wired connection. Transmission of the encoded video data from the file server may be streaming transmission, downloading transmission, or a combination of the streaming transmission and the downloading transmission.

The image prediction method in this application is not limited to a wireless application scenario. For example, the image prediction method in this application may be applied to video encoding and decoding supporting multiple multimedia applications such as the following applications such as over-the-air television broadcasting, cable television transmission, satellite television transmission, streaming-transmission video transmission (for example, by means of the Internet), encoding of video data stored in a data storage medium, decoding of video data stored in a data storage medium, or another application. In some examples, the video encoding and decoding system 7000 may be configured to support unidirectional or bidirectional video transmission in order to support applications such as video streaming transmission, video playing, video broadcasting, and/or videotelephony.

In FIG. 21, the source apparatus 4000 includes a video source 4001, a video encoder 4002, and an output interface 4003. In some examples, the output interface 4003 may include a modulator/demodulator (modem) and/or a transmitter. The video source 4001 may include a video capturing apparatus (for example, a video camera), a video archive including pre-captured video data, a video input interface configured to receive video data from a video content provider, and/or a computer graphics system configured to generate video data, or a combination of the foregoing video data sources.

The video encoder 4002 may encode video data from the video source 4001. In some examples, the source apparatus 4000 directly transmits encoded video data to the destination apparatus 5000 using the output interface 4003. The encoded video data may be further stored in a storage medium or a file server such that the destination apparatus 5000 accesses the encoded video data later for decoding and/or playing.

In the example in FIG. 21, the destination apparatus 5000 includes an input interface 5003, a video decoder 5002, and a display apparatus 5001. In some examples, the input interface 5003 includes a receiver and/or a modem. The input interface 5003 may receive the encoded video data using the channel 6000. The display apparatus 5001 may be integrated with the destination apparatus 5000 or may be outside the destination apparatus 5000. Usually, the display apparatus 5001 displays decoded video data. The display apparatus 5001 may include multiple types of display apparatuses such as a liquid crystal display, a plasma display, an organic light-emitting diode display, or a display apparatus of another type.

The video encoder 4002 and the video decoder 5002 may perform operations according to a video compression standard (for example, a high efficiency video coding H.265 standard), and may comply with a high efficiency video coding (HEVC) test model (HM). Text description ITU-TH.265(V3)(04/2015) of the H.265 standard is released on Apr. 29, 2015, and may be downloaded from http://handle.itu.int/11.1002/7000/12455. The file is incorporated in this specification by reference in its entirety.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely illustrative. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image prediction method, comprising:
   obtaining predicted motion information of an image block;
   determining an initial predicted block of the image block according to the predicted motion information and a reference image of the image block;
   performing, according to the predicted motion information, L iterative searches in the reference image using an integer pixel step size to obtain an intermediate predicted block of the image block, wherein L is a preset value and is an integer greater than 1;
   performing a single search in the reference image using a fractional pixel step size to obtain M predicted blocks of the image block, wherein M is a preset value and is an integer greater than 1;
   determining a target predicted block of the image block according to the M predicted blocks and the intermediate predicted block; and
   obtaining a predicted value of a pixel value of the image block according to a pixel value of the target predicted block.

2. The image prediction method of claim 1, further comprising:
   obtaining, in the reference image, a first predicted block and a second predicted block using an interpolation filter according to the predicted motion information, wherein both the first predicted block and the second predicted block correspond to the image block, and wherein a gain of the interpolation filter is greater than 1; and
   obtaining the initial predicted block according to the first predicted block and the second predicted block, wherein pixel values of the first predicted block, the second predicted block, and the initial predicted block all have a same bit width.

3. The image prediction method of claim 1, further comprising:
   obtaining, in the reference image, a first predicted block and a second predicted block using an interpolation filter according to the predicted motion information, wherein both the first predicted block and the second predicted block correspond to the image block, and wherein a gain of the interpolation filter is greater than 1;
   performing a shift operation on a pixel value of the first predicted block and a pixel value of the second predicted block to reduce bit widths of the pixel values of the first predicted block and the second predicted block to a target bit width, wherein the target bit width is a bit width of a reconstructed pixel value of the image block; and
   obtaining the initial predicted block according to the first predicted block and the second predicted block, wherein a bit width of a pixel value of the initial predicted block is the target bit width.

4. The image prediction method of claim 1, further comprising:
   (a) obtaining current predicted motion information, wherein the current predicted motion information is predicted motion information of the image block when obtaining the current prediction motion at a first time, wherein the current predicted motion information is information about motion of the image block toward a current initial predicted block when obtaining the current predicted motion information at an ith time that is later than the first time, and wherein i is an integer less than or equal to L and greater than 1;

(b) performing, according to the current predicted motion information, a search in the reference image using the integer pixel step size to obtain N predicted blocks corresponding to the image block, wherein N is a preset value and is an integer greater than 1;

(c) obtaining a new current initial predicted block according to the N predicted blocks and the current initial predicted block; and repeatedly performing (a) to (c) for an L number of times to obtain a final initial predicted block as the intermediate predicted block.

5. The image prediction method of claim 1, further comprising determining, in the M predicted blocks, a predicted block having a first pixel value whose difference from a second pixel value of the intermediate predicted block is the pixel value of the target predicted block.

6. The image prediction method of claim 1, wherein the reference image comprises a first direction reference image and a second direction reference image, and wherein the image prediction method further comprises:

performing a search in the first direction reference image using the fractional pixel step size to obtain the M predicted blocks of the image block;

determining, in the M predicted blocks corresponding to the image block, a predicted block having a first pixel value whose difference from the pixel value of the intermediate predicted block is a second pixel value of a first target predicted block;

determining a first motion vector of the image block toward the first target predicted block;

determining a second motion vector according to the first motion vector and according to a preset rule;

determining, in the second direction reference image, a second target predicted block corresponding to the image block according to the second motion vector, wherein the first direction reference image is a forward reference image and the second direction reference image is a backward reference image or the first direction reference image is the backward reference image and the second direction reference image is the forward reference image; and determining the target predicted block according to the first target predicted block and the second target predicted block.

7. The image prediction method of claim 6, further comprising determining that a first distance between the image block and the first direction reference image is less than or equal to a second distance between the image block and the second direction reference image.

8. An image prediction apparatus, comprising:
a non-transitory memory storing instructions; and
a processor coupled to the non-transitory memory and executing the instructions, wherein the instructions cause the image prediction apparatus to be configured to:
obtain predicted motion information of an image block;
determine an initial predicted block of the image block according to the predicted motion information and a reference image of the image block;
perform, according to the predicted motion information, L iterative searches in the reference image using an integer pixel step size to obtain an intermediate predicted block of the image block, wherein L is a preset value and is an integer greater than 1;
perform a single search in the reference image using a fractional pixel step size to obtain M predicted blocks of the image block, wherein M is a preset value and is an integer greater than 1;
determine a target predicted block of the image block according to the M predicted blocks and the intermediate predicted block; and
obtain a predicted value of a pixel value of the image block according to a pixel value of the target predicted block.

9. The image prediction apparatus of claim 8, wherein the instructions further cause the image prediction apparatus to be configured to:
obtain, in the reference image, a first predicted block and a second predicted block using an interpolation filter according to the predicted motion information, wherein both the first predicted block and the second predicted block correspond to the image block, and wherein a gain of the interpolation filter is greater than 1; and
obtain the initial predicted block according to the first predicted block and the second predicted block, wherein pixel values of the first predicted block, the second predicted block, and the initial predicted block all have a same bit width.

10. The image prediction apparatus of claim 8, wherein the instructions further cause the image prediction apparatus to be configured to:
obtain, in the reference image, a first predicted block and a second predicted block using an interpolation filter according to the predicted motion information, wherein both the first predicted block and the second predicted block correspond to the image block, and wherein a gain of the interpolation filter is greater than 1;
perform a shift operation on a pixel value of the first predicted block and a pixel value of the second predicted block to reduce bit widths of the pixel values of the first predicted block and the second predicted block to a target bit width, wherein the target bit width is a bit width of a reconstructed pixel value of the image block; and
obtain the initial predicted block according to the first predicted block and the second predicted block, wherein a bit width of a pixel value of the initial predicted block is the target bit width.

11. The image prediction apparatus of claim 8, wherein the instructions further cause the image prediction apparatus to be configured to:

(a) obtain current predicted motion information, wherein the current predicted motion information is predicted motion information of the image block when obtaining the current prediction motion at a first time, wherein the current predicted motion information is information about motion of the image block toward a current initial predicted block when obtaining the current predicted motion information at an ith time that is later than the first time, and wherein i is an integer less than or equal to L and greater than 1;

(b) perform, according to the current predicted motion information, a search in the reference image using the integer pixel step size, to obtain N predicted blocks corresponding to the image block, wherein N is a preset value and is an integer greater than 1;

(c) obtain a new current initial predicted block according to the N predicted blocks and the current initial predicted block; and repeatedly perform (a) to (c) for an L number of times to obtain a final initial predicted block as the intermediate predicted block.

12. The image prediction apparatus of claim 8, wherein the instructions further cause the image prediction apparatus to be configured to determine, in the M predicted blocks, a predicted block having a first pixel value whose difference from a second pixel value of the intermediate predicted block is the pixel value of the target predicted block.

13. The image prediction apparatus of claim 8, wherein the reference image comprises a first direction reference image and a second direction reference image, and wherein the instructions further cause the image prediction apparatus to be configured to:
 perform a search in the first direction reference image using the fractional pixel step size to obtain the M predicted blocks of the image block;
 determine, in the M predicted blocks corresponding to the image block, a predicted block having a first pixel value whose difference from the pixel value of the intermediate predicted block is a second pixel value of a first target predicted block;
 determine a first motion vector of the image block toward the first target predicted block;
 determine a second motion vector according to the first motion vector and according to a preset rule;
 determine, in the second direction reference image, a second target predicted block corresponding to the image block according to the second motion vector, wherein the first direction reference image is a forward reference image and the second direction reference image is a backward reference image, or the first direction reference image is the backward reference image and the second direction reference image is the forward reference image; and
 determine the target predicted block according to the first target predicted block and the second target predicted block.

14. The image prediction apparatus of claim 13, wherein the instructions further cause the image prediction apparatus to be configured to determine that a first distance between the image block and the first direction reference image is less than or equal to a second distance between the image block and the second direction reference image.

15. An image prediction method, comprising:
 obtaining predicted motion information of an image block;
 determining an initial predicted block of the image block according to the predicted motion information and a reference image of the image block;
 performing, according to the predicted motion information, a single search in the reference image using an integer pixel step size to obtain M predicted blocks of the image block, wherein M is a preset value and is an integer greater than 1;
 determining an intermediate predicted block of the image block according to the M predicted blocks and the initial predicted block;
 determining that the intermediate predicted block is the initial predicted block;
 determining that information about motion of the image block toward the intermediate predicted block is the predicted motion information;
 performing, according to the predicted motion information, L iterative searches in the reference image using a fractional pixel step size to obtain a target predicted block of the image block, wherein L is a preset value and is an integer greater than 1; and
 obtaining a predicted value of a pixel value of the image block according to a pixel value of the target predicted block.

16. The image prediction method of claim 15, further comprising:
 obtaining, in the reference image, a first predicted block and a second predicted block using an interpolation filter according to the predicted motion information, wherein both the first predicted block and the second predicted block correspond to the image block, and wherein a gain of the interpolation filter is greater than 1; and
 obtaining the initial predicted block according to the first predicted block and the second predicted block, wherein pixel values of the first predicted block, the second predicted block, and the initial predicted block all have a same bit width.

17. The image prediction method of claim 15, further comprising:
 obtaining, in the reference image, a first predicted block and a second predicted block using an interpolation filter according to the predicted motion information, wherein both the first predicted block and the second predicted block correspond to the image block, and wherein a gain of the interpolation filter is greater than 1;
 performing a shift operation on a pixel value of the first predicted block and a pixel value of the second predicted block to reduce bit widths of the pixel values of the first predicted block and the second predicted block to a target bit width, wherein the target bit width is a bit width of a reconstructed pixel value of the image block; and
 obtaining the initial predicted block according to the first predicted block and the second predicted block, wherein a bit width of a pixel value of the initial predicted block is the target bit width.

18. An image prediction apparatus, comprising:
 a non-transitory memory storing instructions; and
 a processor coupled to the non-transitory memory and executing the instructions, wherein the instructions cause the image prediction apparatus to be configured to:
 determine an initial predicted block of the image block according to the predicted motion information and a reference image of the image block;
 perform, according to the predicted motion information, a single search in the reference image using an integer pixel step size to obtain M predicted blocks of the image block, wherein M is a preset value and is an integer greater than 1;
 determine an intermediate predicted block of the image block according to the M predicted blocks and the initial predicted block;
 determine that the intermediate predicted block is the initial predicted block;
 determine that information about motion of the image block toward the intermediate predicted block is the predicted motion information;
 perform, according to the predicted motion information, L iterative searches in the reference image using a fractional pixel step size, to obtain a target predicted block of the image block, wherein L is a preset value and is an integer greater than 1; and obtain a predicted value of a pixel value of the image block according to a pixel value of the target predicted block.

19. The image prediction apparatus of claim 18, wherein the instructions further cause the image prediction apparatus to be configured to:

obtain, in the reference image, a first predicted block and a second predicted block using an interpolation filter according to the predicted motion information, wherein both the first predicted block and the second predicted block correspond to the image block, and wherein a gain of the interpolation filter is greater than 1; and obtain the initial predicted block according to the first predicted block and the second predicted block, wherein pixel values of the first predicted block, the second predicted block, and the initial predicted block all have a same bit width.

20. The image prediction apparatus of claim 18, wherein the instructions further cause the image prediction apparatus to be configured to:

obtain, in the reference image, a first predicted block and a second predicted block using an interpolation filter according to the predicted motion information, wherein both the first predicted block and the second predicted block correspond to the image block, and wherein a gain of the interpolation filter is greater than 1;

perform a shift operation on a pixel value of the first predicted block and a pixel value of the second predicted block to reduce bit widths of the pixel values of the first predicted block and the second predicted block to a target bit width, wherein the target bit width is a bit width of a reconstructed pixel value of the image block; and obtain the initial predicted block according to the first predicted block and the second predicted block, wherein a bit width of a pixel value of the initial predicted block is the target bit width.

* * * * *